US011659599B2

(12) United States Patent
Ma et al.

(10) Patent No.: US 11,659,599 B2
(45) Date of Patent: May 23, 2023

(54) RANDOM ACCESS PREAMBLE TRANSMISSION TIMING OFFSET

(71) Applicant: QUALCOMM Incorporated, San Diego, CA (US)

(72) Inventors: Jun Ma, San Diego, CA (US); Qiang Wu, San Diego, CA (US); Dan Zhang, San Diego, CA (US); Alberto Rico Alvarino, San Diego, CA (US); Xiao Feng Wang, San Diego, CA (US); Liangping Ma, San Diego, CA (US); Peter Gaal, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/240,708

(22) Filed: Apr. 26, 2021

(65) Prior Publication Data

US 2021/0337598 A1 Oct. 28, 2021

Related U.S. Application Data

(60) Provisional application No. 63/016,551, filed on Apr. 28, 2020.

(51) Int. Cl.
*H04J 3/00* (2006.01)
*H04W 74/08* (2009.01)
*H04W 72/0446* (2023.01)

(52) U.S. Cl.
CPC ... *H04W 74/0833* (2013.01); *H04W 72/0446* (2013.01)

(58) Field of Classification Search
CPC .............. H04W 74/0833; H04W 72/0446
See application file for complete search history.

(56) References Cited

U.S. PATENT DOCUMENTS

2012/0294173 A1* 11/2012 Su .................. H04W 24/02
370/252
2013/0039314 A1* 2/2013 Prateek ............. H04W 74/08
370/329

(Continued)

FOREIGN PATENT DOCUMENTS

WO    WO-2016106676 A1    7/2016

OTHER PUBLICATIONS

International Search Report and Written Opinion—PCT/US2021/029310—ISA/EPO—dated Aug. 13, 2021 (204072WO).

*Primary Examiner* — Siren Wei
(74) *Attorney, Agent, or Firm* — Holland & Hart LLP/Qualcomm Incorporated

(57) ABSTRACT

Methods, systems, and devices for wireless communications are described. In some systems, a user equipment (UE) may account for propagation delay when initiating a random access (RACH) procedure. For example, the UE may determine transmission timing for a RACH preamble based on an estimated propagation delay, such that the RACH preamble is received at a base station approximately at the beginning of a slot. To support reliable communication of the RACH preamble, the UE may implement a timing offset. In some examples, the base station may configure the UE with the timing offset using system information. Alternatively, the UE may be pre-configured with the timing offset. By determining the transmission timing for the RACH preamble further based on the timing offset, the UE may ensure that the RACH preamble is received at the base station after a slot boundary (e.g., avoiding causing interference to communications in a previous slot).

45 Claims, 22 Drawing Sheets

(56) References Cited

U.S. PATENT DOCUMENTS

| | | | |
|---|---|---|---|
| 2013/0203455 A1* | 8/2013 | Takano | H04W 4/70 455/507 |
| 2014/0044108 A1* | 2/2014 | Earnshaw | G01S 5/0063 370/336 |
| 2015/0181544 A1 | 6/2015 | Liu et al. | |
| 2018/0042052 A1* | 2/2018 | Harjula | H04L 5/06 |
| 2018/0254825 A1* | 9/2018 | Speidel | H04W 56/0045 |
| 2020/0053682 A1 | 2/2020 | Abedini et al. | |
| 2020/0137668 A1* | 4/2020 | Zeng | H04W 72/0453 |
| 2021/0029658 A1* | 1/2021 | Mahalingam | H04B 7/18513 |
| 2022/0086786 A1* | 3/2022 | Narasimha | H04W 56/0005 |

* cited by examiner

RANDOM ACCESS PREAMBLE TRANSMISSION TIMING OFFSET

CROSS REFERENCE

The present application for Patent claims the benefit of U.S. Provisional Patent Application No. 63/016,551 by M A et al., entitled "RANDOM ACCESS PREAMBLE TRANSMISSION TIMING OFFSET," filed Apr. 28, 2020, assigned to the assignee hereof, and expressly incorporated by reference herein.

INTRODUCTION

The following relates to wireless communications and more specifically to random access (RACH) procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving, from a base station, a system information message including a timing offset value and transmitting, to the base station, a RACH preamble message according to a transmission timing for the RACH preamble message, the transmission timing for the RACH preamble message based on the timing offset value.

An apparatus for wireless communications at a UE is described. The apparatus may include a processor and memory coupled to the processor. The processor and memory may be configured to receive, from a base station, a system information message including a timing offset value and transmit, to the base station, a RACH preamble message according to a transmission timing for the RACH preamble message, the transmission timing for the RACH preamble message based on the timing offset value.

Another apparatus for wireless communications at a UE is described. The apparatus may include means for receiving, from a base station, a system information message including a timing offset value and means for transmitting, to the base station, a RACH preamble message according to a transmission timing for the RACH preamble message, the transmission timing for the RACH preamble message based on the timing offset value.

A non-transitory computer-readable medium storing code for wireless communications at a UE is described. The code may include instructions executable by a processor to receive, from a base station, a system information message including a timing offset value and transmit, to the base station, a RACH preamble message according to a transmission timing for the RACH preamble message, the transmission timing for the RACH preamble message based on the timing offset value.

Some examples of the method, apparatuses, and non-transitory computer-readable medium described herein may further include operations, features, means, or instructions for estimating a propagation delay between the UE and the base station, the transmission timing for the RACH preamble message being further based on the estimated propagation delay.

Some examples of the method, apparatuses, and non-transitory computer-readable medium described herein may further include operations, features, means, or instructions for determining a first timing value corresponding to a slot boundary of a slot for transmitting the RACH preamble message, subtracting, from the first timing value, the estimated propagation delay to obtain a second timing value, and adding, to the second timing value, the timing offset value to obtain the transmission timing for the RACH preamble message.

In some examples of the method, apparatuses, and non-transitory computer-readable medium described herein, the transmission timing for the RACH preamble message precedes the first timing value corresponding to the slot boundary of the slot for transmitting the RACH preamble message.

Some examples of the method, apparatuses, and non-transitory computer-readable medium described herein may further include operations, features, means, or instructions for receiving, from the base station and in response to the RACH preamble message, a random access response (RAR) message including a timing advance (TA) value, the TA value based on the transmission timing for the RACH preamble message, modifying the TA value based on the timing offset value, and transmitting, to the base station, a subsequent message according to the modified TA value.

Some examples of the method, apparatuses, and non-transitory computer-readable medium described herein may further include operations, features, means, or instructions for setting the timing offset value to zero based on receiving the RAR message including the TA value, the subsequent message being transmitted based on the timing offset value being set to zero.

Some examples of the method, apparatuses, and non-transitory computer-readable medium described herein may further include operations, features, means, or instructions for subtracting the timing offset value from the TA value to obtain the modified TA value.

In some examples of the method, apparatuses, and non-transitory computer-readable medium described herein, the RAR message includes a RACH message two (Msg2) for a four-step RACH procedure or a RACH message B (MsgB) for a two-step RACH procedure.

Some examples of the method, apparatuses, and non-transitory computer-readable medium described herein may further include operations, features, means, or instructions for determining a system timing for the base station, the transmission timing for the RACH preamble message being further based on the system timing.

In some examples of the method, apparatuses, and non-transitory computer-readable medium described herein, the system information message includes a first system information message, the timing offset value includes a first timing offset value, the RACH preamble message includes a first RACH preamble message and the method, apparatuses, and non-transitory computer-readable medium may include further operations, features, means, or instructions for receiving, from the base station, a second system information message including a second timing offset value different from the first timing offset value, triggering a RACH procedure with the base station, and transmitting, to the base station, a second RACH preamble message for the triggered RACH procedure based on the second timing offset value.

In some examples of the method, apparatuses, and non-transitory computer-readable medium described herein, the system information message includes a system information block (SIB) type one (SIB1) including a field indicating the timing offset value.

In some examples of the method, apparatuses, and non-transitory computer-readable medium described herein, the RACH preamble message includes a RACH message one (Msg1) for a four-step RACH procedure or a RACH message A (MsgA) for a two-step RACH procedure.

A method for wireless communications at a base station is described. The method may include transmitting, to a UE, a system information message including a timing offset value and receiving, from the UE, a RACH preamble message based on the timing offset value.

An apparatus for wireless communications at a base station is described. The apparatus may include a processor and memory coupled to the processor. The processor and memory may be configured to transmit, to a UE, a system information message including a timing offset value and receive, from the UE, a RACH preamble message based on the timing offset value.

Another apparatus for wireless communications at a base station is described. The apparatus may include means for transmitting, to a UE, a system information message including a timing offset value and means for receiving, from the UE, a RACH preamble message based on the timing offset value.

A non-transitory computer-readable medium storing code for wireless communications at a base station is described. The code may include instructions executable by a processor to transmit, to a UE, a system information message including a timing offset value and receive, from the UE, a RACH preamble message based on the timing offset value.

Some examples of the method, apparatuses, and non-transitory computer-readable medium described herein may further include operations, features, means, or instructions for determining a TA value based on a reception time for receiving the RACH preamble message.

Some examples of the method, apparatuses, and non-transitory computer-readable medium described herein may further include operations, features, means, or instructions for transmitting, to the UE and in response to the RACH preamble message, an RAR message including the TA value, the RAR message including a RACH Msg2 for a four-step RACH procedure or a RACH MsgB for a two-step RACH procedure.

Some examples of the method, apparatuses, and non-transitory computer-readable medium described herein may further include operations, features, means, or instructions for receiving, from the UE, a subsequent message based on the TA value and the timing offset value, determining an updated TA value based on a reception time for receiving the subsequent message, and transmitting, to the UE, an indication of the updated TA value.

In some examples of the method, apparatuses, and non-transitory computer-readable medium described herein, the reception time for receiving the RACH preamble message may be based on the timing offset value, an estimated propagation delay between the UE and the base station, an estimated system timing, or a combination thereof.

In some examples of the method, apparatuses, and non-transitory computer-readable medium described herein, the reception time for receiving the RACH preamble message may be subsequent to a slot boundary of a slot for receiving the RACH preamble message.

In some examples of the method, apparatuses, and non-transitory computer-readable medium described herein, the system information message may include a first system information message and the method, apparatuses, and non-transitory computer-readable medium may include further operations, features, means, or instructions for updating the timing offset value and transmitting, to the UE, a second system information message including the updated timing offset value.

In some examples of the method, apparatuses, and non-transitory computer-readable medium described herein, the system information message is transmitted to a set of multiple UEs including the UE and the system information message includes a SIB1 including a field indicating the timing offset value.

A method for wireless communications at a UE is described. The method may include determining a timing offset value based on a configured value for RACH preamble transmission and transmitting, to a base station, a RACH preamble message according to a transmission timing for the RACH preamble message, the transmission timing for the RACH preamble message based on the timing offset value.

An apparatus for wireless communications at a UE is described. The apparatus may include a processor and memory coupled to the processor. The processor and memory may be configured to determine a timing offset value based on a configured value for RACH preamble transmission and transmit, to a base station, a RACH preamble message according to a transmission timing for the RACH preamble message, the transmission timing for the RACH preamble message based on the timing offset value.

Another apparatus for wireless communications at a UE is described. The apparatus may include means for determining a timing offset value based on a configured value for RACH preamble transmission and means for transmitting, to a base station, a RACH preamble message according to a transmission timing for the RACH preamble message, the transmission timing for the RACH preamble message based on the timing offset value.

A non-transitory computer-readable medium storing code for wireless communications at a UE is described. The code may include instructions executable by a processor to determine a timing offset value based on a configured value for RACH preamble transmission and transmit, to a base station, a RACH preamble message according to a transmission timing for the RACH preamble message, the transmission timing for the RACH preamble message based on the timing offset value.

Some examples of the method, apparatuses, and non-transitory computer-readable medium described herein may further include operations, features, means, or instructions for receiving, from the base station and in response to the RACH preamble message, an RAR message including a TA value, the TA value based on the transmission timing for the RACH preamble message, modifying the TA value based on the timing offset value, and transmitting, to the base station, a subsequent message according to the modified TA value.

Some examples of the method, apparatuses, and non-transitory computer-readable medium described herein may further include operations, features, means, or instructions for setting the timing offset value to zero based on receiving the RAR message including the TA value, the subsequent message being transmitted based on the timing offset value being set to zero.

Some examples of the method, apparatuses, and non-transitory computer-readable medium described herein may further include operations, features, means, or instructions for triggering a RACH procedure and resetting the timing offset value to the configured value for RACH preamble transmission based on the triggered RACH procedure.

In some examples of the method, apparatuses, and non-transitory computer-readable medium described herein, the configured value for RACH preamble transmission may be pre-configured at the UE.

Some examples of the method, apparatuses, and non-transitory computer-readable medium described herein may further include operations, features, means, or instructions for receiving a configuration message indicating the configured value for RACH preamble transmission.

Some examples of the method, apparatuses, and non-transitory computer-readable medium described herein may further include operations, features, means, or instructions for estimating a propagation delay between the UE and the base station and determining a system timing for the base station, the transmission timing for the RACH preamble message being further based on the estimated propagation delay or the system timing or both.

A method for wireless communications at a UE is described. The method may include receiving, from a base station, a message including a TA value for RACH preamble transmission, subtracting a timing offset value from the TA value to obtain a modified TA value, and transmitting, to the base station, a RACH preamble message according to a transmission timing for the RACH preamble message, the transmission timing for the RACH preamble message based on the modified TA value.

An apparatus for wireless communications at a UE is described. The apparatus may include a processor and memory coupled to the processor. The processor and memory may be configured to receive, from a base station, a message including a TA value for RACH preamble transmission, subtract a timing offset value from the TA value to obtain a modified TA value, and transmit, to the base station, a RACH preamble message according to a transmission timing for the RACH preamble message, the transmission timing for the RACH preamble message based on the modified TA value.

Another apparatus for wireless communications at a UE is described. The apparatus may include means for receiving, from a base station, a message including a TA value for RACH preamble transmission, means for subtracting a timing offset value from the TA value to obtain a modified TA value, and means for transmitting, to the base station, a RACH preamble message according to a transmission timing for the RACH preamble message, the transmission timing for the RACH preamble message based on the modified TA value.

A non-transitory computer-readable medium storing code for wireless communications at a UE is described. The code may include instructions executable by a processor to receive, from a base station, a message including a TA value for RACH preamble transmission, subtract a timing offset value from the TA value to obtain a modified TA value, and transmit, to the base station, a RACH preamble message according to a transmission timing for the RACH preamble message, the transmission timing for the RACH preamble message based on the modified TA value.

In some examples of the method, apparatuses, and non-transitory computer-readable medium described herein, the modified TA value may be less than zero based on the subtracting.

In some examples of the method, apparatuses, and non-transitory computer-readable medium described herein, the modified TA value may be greater than or equal to zero.

A method for wireless communications at a UE is described. The method may include receiving, from a base station, a system information message including a timing offset value, determining a transmission timing for a RACH preamble message based on the timing offset value, and transmitting, to the base station, the RACH preamble message according to the transmission timing.

An apparatus for wireless communications at a UE is described. The apparatus may include a processor and memory coupled to the processor, the processor and memory configured to receive, from a base station, a system information message including a timing offset value, determine a transmission timing for a RACH preamble message based on the timing offset value, and transmit, to the base station, the RACH preamble message according to the transmission timing.

Another apparatus for wireless communications at a UE is described. The apparatus may include means for receiving, from a base station, a system information message including a timing offset value, determining a transmission timing for a RACH preamble message based on the timing offset value, and transmitting, to the base station, the RACH preamble message according to the transmission timing.

A non-transitory computer-readable medium storing code for wireless communications at a UE is described. The code may include instructions executable by a processor to receive, from a base station, a system information message including a timing offset value, determine a transmission timing for a RACH preamble message based on the timing offset value, and transmit, to the base station, the RACH preamble message according to the transmission timing.

Some examples of the method, apparatuses, and non-transitory computer-readable medium described herein may further include operations, features, means, or instructions for estimating a propagation delay between the UE and the base station, where the transmission timing for the RACH preamble message may be further based on the estimated propagation delay.

In some examples of the method, apparatuses, and non-transitory computer-readable medium described herein, determining the transmission timing for the RACH preamble message may include operations, features, means, or instructions for determining a first timing value corresponding to a slot boundary of a slot for transmitting the RACH preamble message, subtracting, from the first timing value, the estimated propagation delay to obtain a second timing value, and adding, to the second timing value, the timing offset value to obtain the transmission timing for the RACH preamble message.

In some examples of the method, apparatuses, and non-transitory computer-readable medium described herein, the transmission timing for the RACH preamble message precedes the first timing value corresponding to the slot boundary of the slot for transmitting the RACH preamble message.

Some examples of the method, apparatuses, and non-transitory computer-readable medium described herein may further include operations, features, means, or instructions for receiving, from the base station and in response to the RACH preamble message, an RAR message including a TA value, the TA value based on the transmission timing. Some such examples of the method, apparatuses, and non-transitory computer-readable medium described herein may further include operations, features, means, or instructions for modifying the TA value based on the timing offset value and transmitting, to the base station, a subsequent message according to the modified TA value.

Some examples of the method, apparatuses, and non-transitory computer-readable medium described herein may further include operations, features, means, or instructions for setting the timing offset value to zero based on receiving the RAR message including the TA value, where the subsequent message may be transmitted based on the timing offset value being set to zero.

In some examples of the method, apparatuses, and non-transitory computer-readable medium described herein, modifying the TA value may include operations, features, means, or instructions for subtracting the timing offset value from the TA value to obtain the modified TA value.

In some examples of the method, apparatuses, and non-transitory computer-readable medium described herein, the RAR message may include a RACH Msg2 for a four-step RACH procedure or a RACH MsgB for a two-step RACH procedure.

In some examples of the method, apparatuses, and non-transitory computer-readable medium described herein, the TA value may be greater than zero.

Some examples of the method, apparatuses, and non-transitory computer-readable medium described herein may further include operations, features, means, or instructions for determining a system timing for the base station, where the transmission timing for the RACH preamble message may be further based on the system timing.

In some examples of the method, apparatuses, and non-transitory computer-readable medium described herein, the system timing may be determined based on a global navigation satellite system (GNSS).

In some examples of the method, apparatuses, and non-transitory computer-readable medium described herein, the system information message may include a first system information message, the timing offset value may include a first timing offset value, and the RACH preamble message may include a first RACH preamble message. Some examples of the method, apparatuses, and non-transitory computer-readable medium described herein may further include operations, features, means, or instructions for receiving, from the base station, a second system information message including a second timing offset value different from the first timing offset value, triggering a RACH procedure with the base station, and transmitting, to the base station, a second RACH preamble message for the triggered RACH procedure based on the second timing offset value.

Some examples of the method, apparatuses, and non-transitory computer-readable medium described herein may further include operations, features, means, or instructions for operating in a non-terrestrial network (NTN), where determining the transmission timing for the RACH preamble message based on the timing offset value may be further based on operating in the NTN.

In some examples of the method, apparatuses, and non-transitory computer-readable medium described herein, the system information message may include a SIB1 including a field indicating the timing offset value.

In some examples of the method, apparatuses, and non-transitory computer-readable medium described herein, the RACH preamble message may include a RACH Msg1 for a four-step RACH procedure or a RACH MsgA for a two-step RACH procedure.

In some examples of the method, apparatuses, and non-transitory computer-readable medium described herein, the timing offset value may be greater than zero.

A method for wireless communications at a base station is described. The method may include transmitting, to a set of UEs, a system information message including a timing offset value and receiving, from a UE of the set of UEs, a RACH preamble message based on the timing offset value.

An apparatus for wireless communications at a base station is described. The apparatus may include a processor and memory coupled to the processor, the processor and memory configured to transmit, to a set of UEs, a system information message including a timing offset value and receive, from a UE of the set of UEs, a RACH preamble message based on the timing offset value.

Another apparatus for wireless communications at a base station is described. The apparatus may include means for transmitting, to a set of UEs, a system information message including a timing offset value and receiving, from a UE of the set of UEs, a RACH preamble message based on the timing offset value.

A non-transitory computer-readable medium storing code for wireless communications at a base station is described. The code may include instructions executable by a processor to transmit, to a set of UEs, a system information message including a timing offset value and receive, from a UE of the set of UEs, a RACH preamble message based on the timing offset value.

Some examples of the method, apparatuses, and non-transitory computer-readable medium described herein may further include operations, features, means, or instructions for determining a TA value based on a reception time for receiving the RACH preamble message.

Some examples of the method, apparatuses, and non-transitory computer-readable medium described herein may further include operations, features, means, or instructions for transmitting, to the UE and in response to the RACH preamble message, an RAR message including the TA value.

Some examples of the method, apparatuses, and non-transitory computer-readable medium described herein may further include operations, features, means, or instructions for receiving, from the UE, a subsequent message based on the TA value and the timing offset value, determining an updated TA value based on a reception time for receiving the subsequent message, and transmitting, to the UE, an indication of the updated TA value.

In some examples of the method, apparatuses, and non-transitory computer-readable medium described herein, the RAR message may include a RACH Msg2 for a four-step RACH procedure or a RACH MsgB for a two-step RACH procedure.

In some examples of the method, apparatuses, and non-transitory computer-readable medium described herein, the reception time for receiving the RACH preamble message may be based on the timing offset value.

In some examples of the method, apparatuses, and non-transitory computer-readable medium described herein, the reception time for receiving the RACH preamble message may be further based on an estimated propagation delay between the UE and the base station or an estimated system timing or both.

In some examples of the method, apparatuses, and non-transitory computer-readable medium described herein, the reception time for receiving the RACH preamble message may be subsequent to a slot boundary of a slot for receiving the RACH preamble message.

In some examples of the method, apparatuses, and non-transitory computer-readable medium described herein, the TA value may be greater than zero.

In some examples of the method, apparatuses, and non-transitory computer-readable medium described herein, the system information message may include a first system information message and the method, apparatuses, and non-transitory computer-readable medium described herein may further include operations, features, means, or instructions for updating the timing offset value and transmitting, to the set of UEs, a second system information message including the updated timing offset value.

Some examples of the method, apparatuses, and non-transitory computer-readable medium described herein may further include operations, features, means, or instructions for operating in an NTN, where transmitting the system information message including the timing offset value may be based on operating in the NTN.

In some examples of the method, apparatuses, and non-transitory computer-readable medium described herein, the system information message may include a SIB1 including a field indicating the timing offset value.

In some examples of the method, apparatuses, and non-transitory computer-readable medium described herein, the RACH preamble message may include a RACH Msg1 for a four-step RACH procedure or a RACH MsgA for a two-step RACH procedure.

In some examples of the method, apparatuses, and non-transitory computer-readable medium described herein, the timing offset value may be greater than zero.

A method for wireless communications at a UE is described. The method may include determining a timing offset value based on a configured value for RACH preamble transmission, determining a transmission timing for a RACH preamble message based on the timing offset value, and transmitting, to a base station, the RACH preamble message according to the transmission timing.

An apparatus for wireless communications at a UE is described. The apparatus may include a processor and memory coupled to the processor, the processor and memory configured to determine a timing offset value based on a configured value for RACH preamble transmission, determine a transmission timing for a RACH preamble message based on the timing offset value, and transmit, to a base station, the RACH preamble message according to the transmission timing.

Another apparatus for wireless communications at a UE is described. The apparatus may include means for determining a timing offset value based on a configured value for RACH preamble transmission, determining a transmission timing for a RACH preamble message based on the timing offset value, and transmitting, to a base station, the RACH preamble message according to the transmission timing.

A non-transitory computer-readable medium storing code for wireless communications at a UE is described. The code may include instructions executable by a processor to determine a timing offset value based on a configured value for RACH preamble transmission, determine a transmission timing for a RACH preamble message based on the timing offset value, and transmit, to a base station, the RACH preamble message according to the transmission timing.

Some examples of the method, apparatuses, and non-transitory computer-readable medium described herein may further include operations, features, means, or instructions for receiving, from the base station and in response to the RACH preamble message, an RAR message including a TA value, the TA value based on the transmission timing. Some such examples of the method, apparatuses, and non-transitory computer-readable medium described herein may further include operations, features, means, or instructions for modifying the TA value based on the timing offset value and transmitting, to the base station, a subsequent message according to the modified TA value.

Some examples of the method, apparatuses, and non-transitory computer-readable medium described herein may further include operations, features, means, or instructions for setting the timing offset value to zero based on receiving the RAR message including the TA value, where the subsequent message may be transmitted based on the timing offset value being set to zero.

Some examples of the method, apparatuses, and non-transitory computer-readable medium described herein may further include operations, features, means, or instructions for triggering a RACH procedure and resetting the timing offset value to the configured value for RACH preamble transmission based on the triggered RACH procedure.

In some examples of the method, apparatuses, and non-transitory computer-readable medium described herein, the configured value for RACH preamble transmission may be pre-configured at the UE.

Some examples of the method, apparatuses, and non-transitory computer-readable medium described herein may further include operations, features, means, or instructions for receiving a configuration message indicating the configured value for RACH preamble transmission.

Some examples of the method, apparatuses, and non-transitory computer-readable medium described herein may further include operations, features, means, or instructions for estimating a propagation delay between the UE and the base station and determining a system timing for the base station, where the transmission timing for the RACH preamble message may be further based on the estimated propagation delay or the system timing or both.

Some examples of the method, apparatuses, and non-transitory computer-readable medium described herein may further include operations, features, means, or instructions for operating in an NTN, where determining the transmission timing for the RACH preamble message based on the timing offset value may be further based on operating in the NTN.

In some examples of the method, apparatuses, and non-transitory computer-readable medium described herein, the configured value for RACH preamble transmission may be greater than zero.

DETAILED DESCRIPTION

Figure 1:
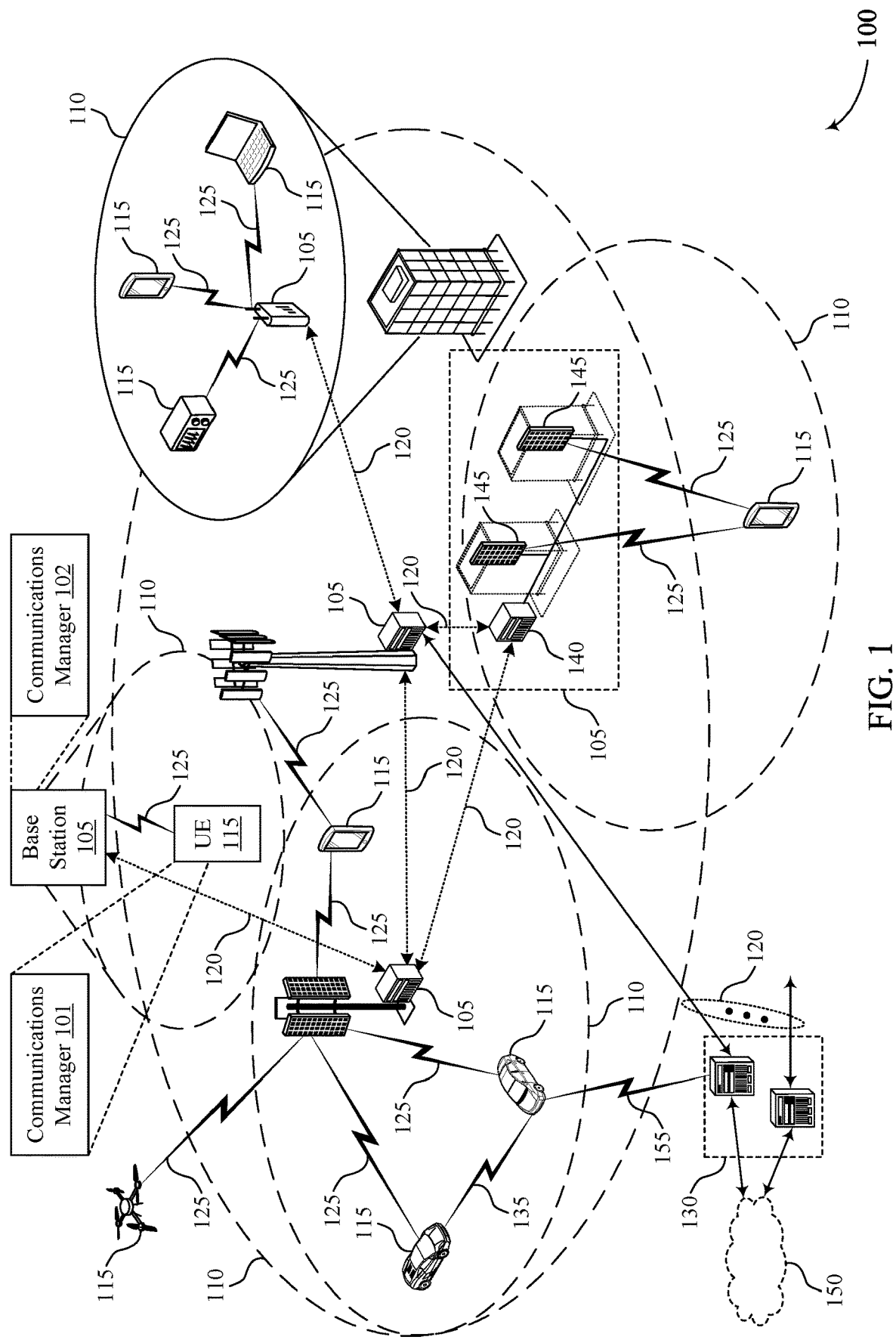
FIGS. 1 and 2 illustrate examples of wireless communications systems that support a RACH preamble transmission timing offset, in accordance with one or more aspects of the present disclosure.

In some wireless communications systems, a UE may perform a RACH procedure to obtain synchronization and resources for communications with a network. For example, the UE may receive system information from a base station and may determine to connect to the base station. The UE may initiate a RACH procedure by transmitting a RACH preamble to the base station. In some systems (e.g., NTNs or other networks), the UE may track system timing for the network (e.g., using a GNSS or some other mechanism). Additionally or alternatively, the UE may estimate a propagation delay between the UE and the base station (e.g., based on information for the base station). Using the system timing and the estimated propagation delay, the UE may determine a transmission timing for the RACH preamble to pre-compensate for the propagation delay. Accordingly, to transmit a RACH preamble message in a specific slot, the UE may transmit the RACH preamble message prior to the leading slot boundary, such that—with the propagation delay—the RACH preamble message is received by the base station at or near the beginning of the slot. However, in some cases, the system timing tracked at the UE, the propagation delay estimated at the UE, or both may be slightly inaccurate. In some cases, such inaccuracies may cause the RACH preamble message to arrive at the base station prior to the leading slot boundary, potentially interfering with communications (e.g., uplink transmissions) performed in the previous slot.

To improve an accuracy of system timing and propagation delay estimates, a UE may implement a timing offset for RACH preamble transmission. The timing offset may correspond to a system-wide parameter. In some examples, the base station may transmit an indication of the timing offset value in system information (e.g., as a parameter in a SIB1 message). In some other examples, the UE may be pre-configured with the timing offset value. The UE may determine the transmission timing for the RACH preamble message based on the timing offset value (e.g., in addition to the system timing and propagation delay estimation). For example, the UE may identify a slot boundary based on the system timing, advance the transmission timing based on the estimated propagation delay, and back off the transmission timing based on the timing offset value. The UE may transmit, to the base station, the RACH preamble message according to the determined transmission timing. By backing off the transmission timing according to the timing offset value, the UE may ensure that the RACH preamble is received at the base station at or after the slot boundary, avoiding causing interference to communications in the previous slot.

In some implementations, the UE may modify the value of the timing offset for different procedures. For example, the UE may use the timing offset value configured by the base station for RACH preamble transmissions. In some cases, the UE may receive an RAR message from the base station in response to the RACH preamble message. The RAR message may include a TA value calculated based on the reception timing for the RACH preamble at the base station. As the RACH preamble transmission timing is based on the timing offset value, the TA value may be similarly influenced by the timing offset value. Accordingly, the UE may modify the received TA value based on the timing offset value and may transmit a subsequent message (e.g., a RACH message 3 (Msg3) or another message) to the base station using the modified TA value. In some cases, the UE may use the timing offset value and the modified TA value for transmissions on the physical random access channel (PRACH) and may set the timing offset value to zero for transmissions on other channels (e.g., the physical uplink control channel (PUCCH), the physical uplink shared channel (PUSCH), or any other physical channels). Additionally or alternatively, different base stations may configure different timing offset values. Further, a base station may update a timing offset value and may indicate the updated timing offset value in system information.

Implementing various aspects of the described techniques may enable a UE to adjust RACH preamble transmission timing based on a timing offset value indicated by a base station. Adjusting the RACH preamble transmission timing may reduce or otherwise mitigate interference between slots caused by the RACH preamble transmission. Mitigating inter-slot interference may result in an improved accuracy of communications, an increased efficiency, a more efficient resource utilization, or any combination thereof in a wireless communications system.

Aspects of the disclosure are initially described in the context of wireless communications systems. Additional aspects of the disclosure are described with reference to a processing timeline and a process flow. Aspects of the disclosure are further illustrated by and described with reference to apparatus diagrams, system diagrams, and flowcharts that relate to a RACH preamble transmission timing offset.

FIG. 1 illustrates an example of a wireless communications system 100 that supports a RACH preamble transmission timing offset, in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, a UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The electromagnetic spectrum is often subdivided, based on frequency/wavelength, into various classes, bands, channels, etc. In 5G NR, two initial operating bands have been identified as frequency range designations FR1 (410 megahertz (MHz)-7.125 gigahertz (GHz)) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix (CP) prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 MHz to 300 GHz. The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support a terrestrial network, an NTN, or some combination thereof. A terrestrial network may involve devices (e.g., base stations 105, UEs 115, or both) operating at or near Earth's surface. In contrast, an NTN may involve devices (e.g., base stations 105, UEs 115, or both) operating at altitude (e.g., between 8 and 50 kilometers (km)). For example, devices in an NTN may include satellites or other airborne or spaceborne vehicles or devices communicating in a wireless communications system 100. In some examples, a base station 105 (e.g., a satellite) may provide network coverage for terrestrial UEs in an NTN. Some wireless communications systems 100 (e.g., NR systems or other systems) may integrate terrestrial and non-terrestrial segments into an integrated network infrastructure.

UEs 115 in the wireless communications system 100 may perform initial access using a RACH procedure. The RACH procedure may allow a UE 115 to synchronize with the network for communication. In some cases, a UE 115 may perform a RACH procedure to initially access the network from a radio resource control (RRC) idle mode, re-establish an RRC connection, perform handover from one base station 105 to another, or perform any combination of these or other access procedures. A UE 115 may perform contention-based or contention-free RACH using a four-step or two-step RACH procedure. In a four-step RACH procedure, the UE 115 may transmit a RACH preamble (e.g., a RACH Msg1) to a base station 105 to initiate the RACH procedure. The RACH preamble may include a random access radio network temporary identifier (RA-RNTI) and may be transmitted on a PRACH. The base station 105 may respond with an RAR message (e.g., a RACH Msg2) carrying connection information for the UE 115. The UE 115 may transmit a RACH Msg3 based on the RAR message (e.g., in order to request an RRC connection), and the base station 105 may complete the RACH procedure by transmitting a RACH message 4 (Msg4) to the UE 115 for contention resolution. In a two-step RACH procedure, the UE 115 may combine the RACH preamble and the RACH Msg3 into a single transmission (e.g., referred to as a RACH MsgA, and the base station 105 may respond with a combination of the RAR message and the RACH Msg4 (e.g., referred to as a RACH MsgB).

In some wireless communications systems (e.g., a system supporting an NTN or another wireless system), a UE 115 may pre-compensate for a propagation delay between the UE 115 and a base station 105 when transmitting a RACH preamble message. For example, the UE 115 may estimate a system timing for the base station 105 and the propagation delay, and the UE 115 may determine a transmission timing for the RACH preamble based on the estimated system timing and the estimated propagation delay in order for the RACH preamble transmission to arrive at the base station 105 at—or near—a slot boundary (e.g., to reduce latency, improve RACH preamble reliability, or both). However, in some cases, the estimated system timing, the estimated propagation delay, or both may be inaccurate. To mitigate the effects of such inaccuracies, the UE 115 may implement a timing offset for RACH preamble transmission. In some examples, the base station 105 may configure the UE 115 with the timing offset value. For example, using the communications manager 102, the base station 105 may transmit system information including an indication of the timing offset value. In some other examples, the UE 115 may be pre-configured with the timing offset value. Based on the timing offset value and using a communications manager 101, the UE 115 may adjust the transmission timing for the RACH preamble to ensure that the RACH preamble transmission arrives at the base station 105 at or after the slot boundary.

Figure 2:
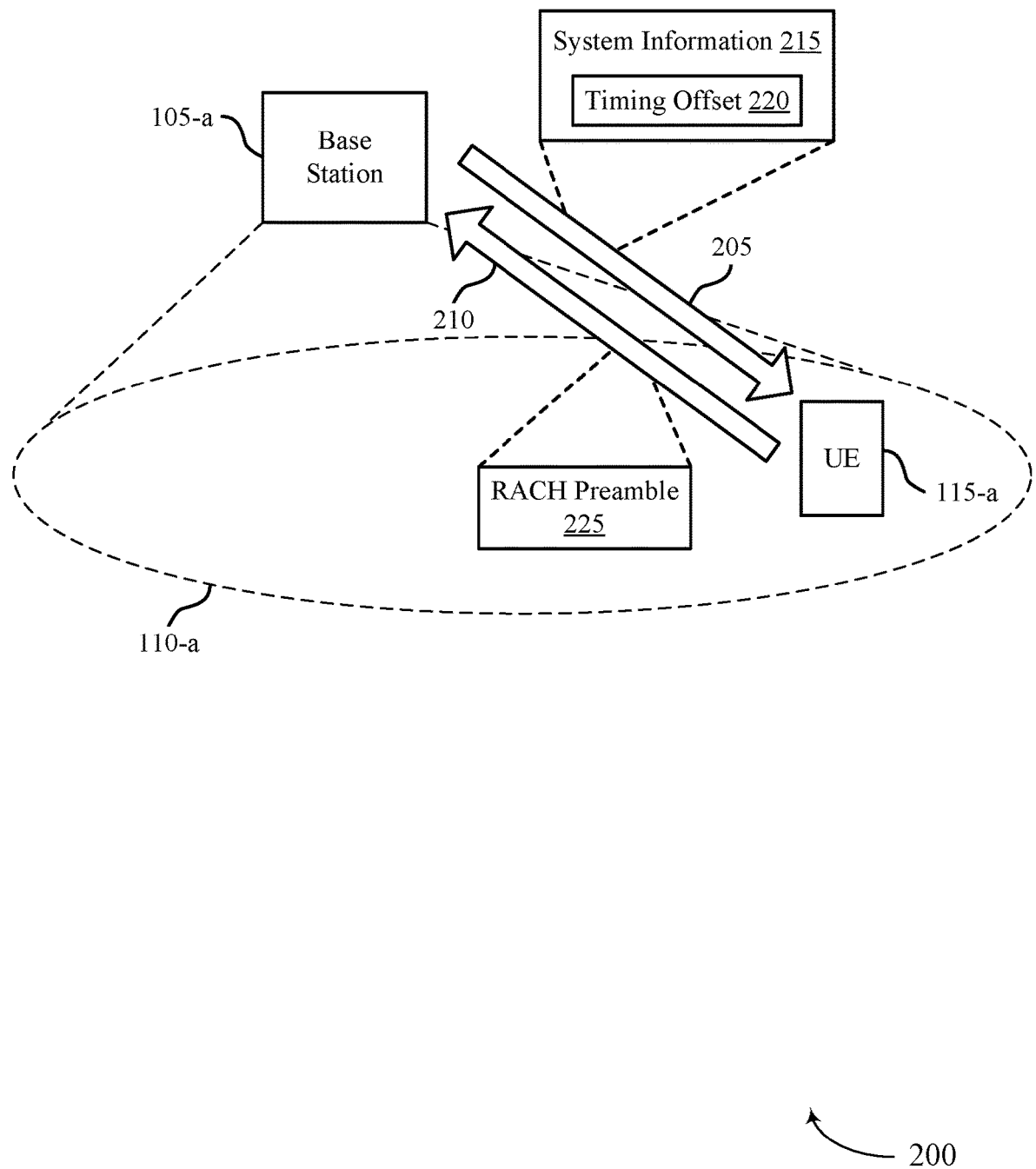

FIG. 2 illustrates an example of a wireless communications system 200 that supports a RACH preamble transmission timing offset, in accordance with one or more aspects of the present disclosure. In some examples, the wireless communications system 200 may implement aspects of a wireless communications system 100. The wireless communications system 200 may include a UE 115-*a* which may be an example of a UE 115 as described with reference to FIG. 1. The wireless communications system 200 may also include a base station 105-*a* which may be an example of a base station 105 as described with reference to FIG. 1. The base station 105-*a* may be associated with a cell which provides wireless communication service within a respective coverage area 110-*a*. The base station 105-*a* may transmit information to one or more UEs 115 on a downlink channel 205, and the UE 115-*a* may transmit messages to the base station 105-*a* on an uplink channel 210. In some examples, as described herein, the UE 115-*a* may use a transmission timing offset to reliably transmit a RACH preamble to the base station 105-*a* within a slot.

In some implementations, the wireless communications system 200 may be an example of—or otherwise include—an NTN. The NTN may be an example of a wireless network supporting one or more airborne or spaceborne vehicles for communications. Accordingly, in some examples, the base station 105-*a* may be an example of a satellite providing coverage for one or more UEs 115 (e.g., terrestrial UEs 115). In some other examples, the base station 105-*a* may be an example of an aircraft operating at altitude. Alternatively, the wireless communications system 200 may be an example of another type of network (e.g., a terrestrial network).

The UE 115-*a* may transmit a RACH preamble 225 to initiate a RACH procedure with the base station 105-*a*. In some examples, the UE 115-*a* may determine a transmission timing for transmitting the RACH preamble 225. For example, the UE 115-*a* may estimate a propagation delay between the UE 115-*a* and the base station 105-*a* for the RACH preamble 225 transmission and may determine the transmission timing to account for the estimated propagation delay. In some cases, the UE 115-*a* may estimate the propagation delay based on a downlink transmission from the base station 105-*a*. Additionally or alternatively, the UE 115-*a* may estimate the propagation delay based on satellite ephemeris information (e.g., for the base station 105-*a* in an NTN). The UE 115-*a* may further determine system timing for the network. For example, the UE 115-*a* may track system timing using a GNSS, such that the UE 115-*a* may determine slot timing maintained by the base station 105-*a* (e.g., prior to receiving a downlink signal from the base station 105-*a*). Using the system timing and the estimated propagation delay, the UE 115-*a* may determine the transmission timing for the RACH preamble 225 such that the timing compensates for the estimated propagation delay. For example, the UE 115-*a* may identify a slot based on the system timing and may advance transmission timing of the RACH preamble 225 ahead of the slot to account for the estimated propagation delay, such that the RACH preamble 225 may arrive at the base station 105-*a* at—or near—the start of the slot (e.g., the leading slot boundary).

However, in some cases, the system timing, the estimated propagation delay, or both may be inaccurate. If the system timing, estimated propagation delay, or both are inaccurate, the transmission timing may cause the RACH preamble 225 to arrive at a time either before or after the slot boundary. If the RACH preamble 225 arrives at the base station 105-*a* after the slot boundary, which may be referred to as a positive timing error, the base station 105-*a* may transmit a TA command instructing the UE 115-*a* to compensate for the delay. If the RACH preamble 225 arrives at the base station 105-*a* before the slot boundary, which may be referred to as a negative timing error, the RACH preamble 225 may potentially interfere with other transmissions received by the base station 105-*a* (e.g., in a previous slot). Further, a TA command may support positive TA values, instructing the UE 115-*a* to advance transmission timing (i.e., transmit earlier in time). However, a TA command may not support instructing the UE 115-*a* to back off transmission timing (i.e., transmit later in time) if the RACH preamble 225 arrives prior to the slot boundary, as the TA command may define positive TA values.

To account for potential inaccuracies in the propagation delay estimation, the system timing estimation, or both, the UE 115-*a* may determine the transmission timing of the RACH preamble 225 further based on a timing offset 220. Accordingly, the UE 115-*a* may adjust the transmission timing of the RACH preamble 225 by an amount equal to the timing offset 220. The UE 115-*a* may determine the timing offset (e.g., based on a configured value). In some examples, the timing offset 220 may be received as part of a downlink transmission from the base station 105-*a*. In some such examples, the timing offset 220 may be included in broadcast signaling, such as a system information message 215 (e.g., a SIB, such as SIB1). By using broadcast signaling, the base station 105-*a* may indicate the timing offset 220 as a system-wide parameter. In some cases, the base station 105-*a* may update the timing offset 220 and may retransmit the updated timing offset 220 in a system information message 215. Additionally or alternatively, the base station 105-*a* may determine the timing offset 220 based on a timing accuracy of one or more UEs 115.

In some other examples, the timing offset 220 may be pre-configured at the UE 115-*a*. For example, the timing offset 220 may be based on another parameter configured at the UE 115-a, such as a CP length. In an example, the timing offset 220 may be equal to half the CP length for the UE 115-a. In some cases, all UEs 115 in the wireless communications system 200 may be pre-configured with a same timing offset 220. In some other cases, different UEs 115 may have different timing offsets 220. For example, the timing offset 220 for a specific UE 115 may be configured based on a timing accuracy of the UE 115.

The timing offset 220 may be a positive number defining a back off time for RACH preamble 225 transmission. In some examples, the timing offset 220 may represent a maximum negative timing error for one or more UEs 115 (e.g., based on a capability of the UEs 115). In some examples, all UEs 115 operating in the wireless communications system 200 may pass a performance test checking to ensure that no UE 115 exceeds the maximum negative timing error (e.g., under test conditions). That is, operators deploying the wireless communications system 200 (e.g., an NTN) may check to ensure that the potential timing inaccuracies of subscriber UEs do not exceed this maximum negative timing error. By setting the timing offset 220 to the maximum negative timing error, the base station 105-a may ensure that a RACH preamble 225 is received at or after a slot boundary, for example, even in a worst case scenario (e.g., if the UE's estimated system timing and propagation delay is inaccurate by the maximum negative timing error). In some examples, the timing offset 220 may be a parameter in system information. For example, the timing offset 220 may be indicated by a "prachTimingOffset" field (or some other field) in a SIB 1.

The UE 115-a may back off its transmission timing by an amount equal to the timing offset 220 when transmitting a RACH preamble 225. For example, the UE 115-a may identify a slot for transmission of the RACH preamble 225, advance transmission timing ahead of the leading slot boundary by the estimated propagation delay and back off the transmission timing by the timing offset 220. The base station 105-a may receive the RACH preamble 225 in the slot (e.g., at or after the leading slot boundary based on implementing the timing offset 220).

In some cases, the UE 115-a may receive an RAR from the base station 105-a in response to the RACH preamble 225. The RAR may include a TA command indicating a timing adjustment for the UE 115-a. In some examples, the TA command may include a TA value calculated by the base station 105-a to compensate for any delay the base station 105-a measured when receiving the RACH preamble 225. In some cases, the TA value may be influenced by the timing offset 220 used by the UE 115-a. For example, the base station 105-a may calculate the TA value based on the amount of time after the slot boundary that the RACH preamble 225 is received; however, because the reception timing is delayed based on the UE 115-a delaying the transmission timing according to the timing offset 220, the TA value may be biased by the timing offset 220. As such, the UE 115-a may modify the received TA value based on the timing offset 220. For example, the UE 115-a may subtract the timing offset 220 from the TA value to obtain a modified TA value for transmissions. By subtracting the timing offset 220 from the TA, the UE 115-a may correct for the timing offset 220 applied to the RACH preamble 225 transmission. The UE 115-a may transmit one or more subsequent messages based on the modified TA value. Additionally, the UE 115-a may set the timing offset 220 to zero for subsequent messages, other channels, or both. For example, the UE 115-a may transmit a RACH Msg3 to the base station 105-a using the modified TA value and a timing offset of zero (e.g., no timing offset). Based on the TA value, the subsequent message (e.g., a RACH Msg3) may arrive approximately at a slot boundary at the base station 105-a.

Figure 3:
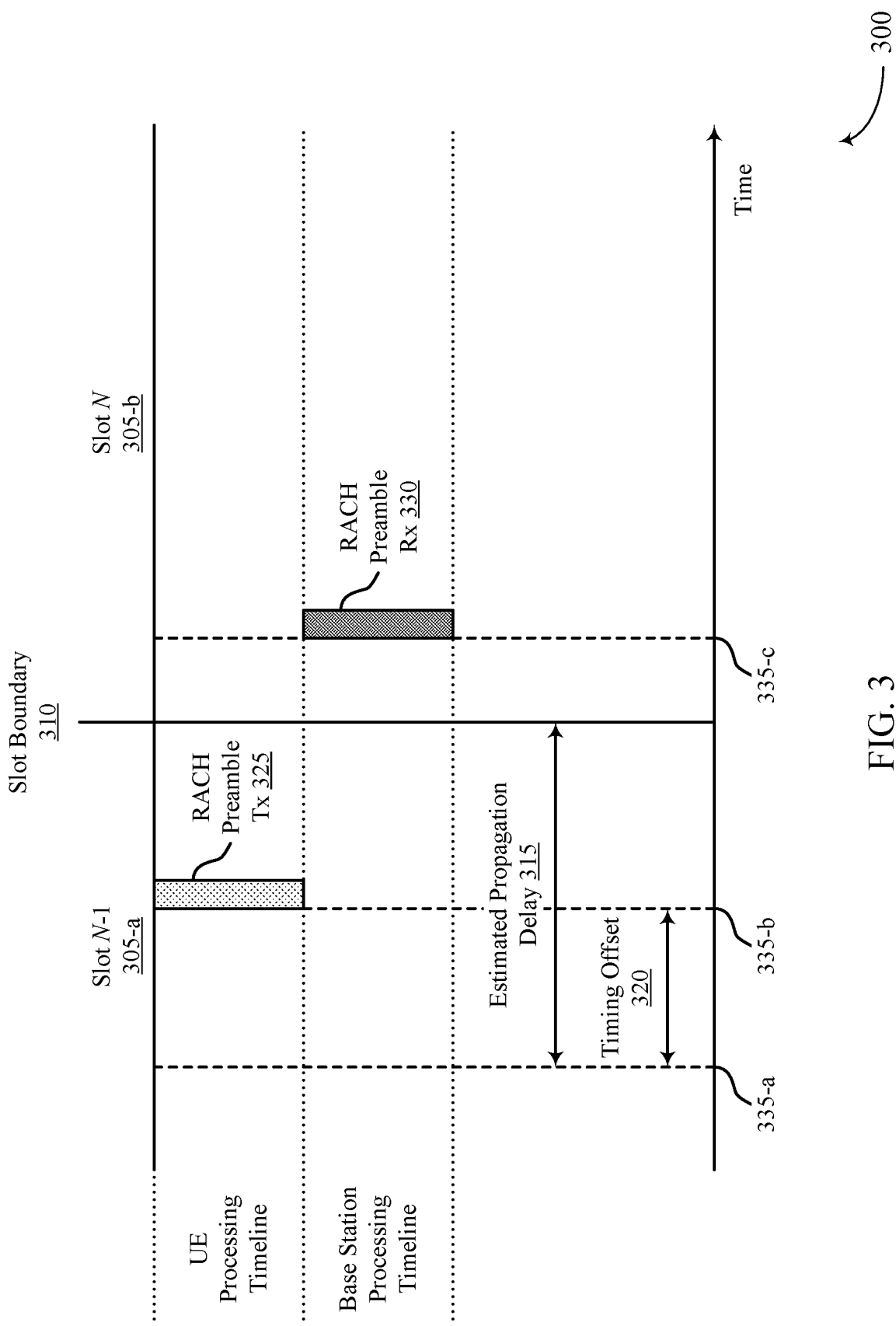
FIG. 3 illustrates an example of a processing timeline that supports a RACH preamble transmission timing offset, in accordance with one or more aspects of the present disclosure.

FIG. 3 illustrates an example of a processing timeline 300 that supports a RACH preamble transmission timing offset, in accordance with one or more aspects of the present disclosure. In some examples, the processing timeline 300 may implement aspects of a wireless communications system 100 or 200. For example, aspects of the processing timeline 300 may be implemented by a UE 115, a base station 105, or a combination thereof. As illustrated, the processing timeline 300 may show example transmission timing adjustments for a RACH preamble message.

A UE 115 may determine to transmit a RACH preamble to a base station 105 in a slot N 305-b, which may be an example of a TTI or sTTI. The UE 115 may be equipped with a GNSS and may estimate the slot boundary 310 (e.g., the leading slot boundary of the slot N 305-b) using a system timing obtained from the GNSS. Additionally, the UE 115 may estimate a propagation delay 315 between the UE 115 and the base station 105. For example, because the UE 115 may not yet be connected to the base station 105, the UE 115 may not have a TA value to apply to compensate for the actual propagation delay (e.g., based on closed-loop timing control between the base station 105 and the UE 115). Instead, the UE 115 may implement open-loop timing control using one or more techniques to estimate the propagation delay (e.g., without feedback from the base station 105). In some examples, the UE 115 may use satellite ephemeris information from the base station 105 (e.g., a satellite in an NTN) to estimate the propagation delay 315. The UE 115 may use the estimated propagation delay 315 to determine an initial transmission timing for a RACH preamble transmission 325 at time 335-a.

If the estimated propagation delay 315 is accurate, the base station 105 may receive the RACH preamble at the slot boundary 310. However, if the estimated propagation delay 315, the slot boundary 310 determined from the system timing, or both are inaccurate, and the UE 115 transmits the RACH preamble at time 335-a, the base station 105 may receive the RACH preamble either before or after the slot boundary 310. If the base station 105 receives the RACH preamble after the slot boundary 310, the base station may send a TA command instructing the UE 115 to compensate for the delay (e.g., using a positive TA value). If, however, the base station 105 receives the RACH preamble prior to the slot boundary 310 (e.g., in slot N−1 305-a), the RACH preamble may interfere with other transmissions (e.g., uplink transmissions received by the base station 105) in slot N−1 305-a.

To mitigate the effects of a negative timing error, the UE 115 may determine the transmission timing for the RACH preamble based on a timing offset 320. In some examples, the UE 115 may adjust the transmission timing by an amount of time equal to the timing offset 320 such that the UE 115 transmits the RACH preamble at time 335-b (e.g., rather than at time 335-a). If the UE 115 performs the RACH preamble transmission 325 at time 335-b (e.g., based on the timing offset 320), the base station 105 may receive the RACH preamble at a time 335-c at or after the slot boundary 310 (e.g., even if minor inaccuracies in the slot boundary 310 timing, the estimated propagation delay 315, or both are present). This RACH preamble reception 330 at the base station 105 in the slot N 305-b may not interfere with communications in the previous slot N−1 305-a. In some cases, the base station 105 may send a TA command instructing the UE 115 to compensate for the delay in reception (e.g., based on the difference between time 335-*c* and the slot boundary 310). For example, the base station 105 may detect any inaccuracies in the propagation delay estimation or system timing at the UE 115 based on the received RACH preamble and may correct for such inaccuracies using the TA command for closed-loop timing control. As such, the UE 115 may correct subsequent transmission timings based on the TA command.

For the initial RACH preamble transmission (e.g., before the UE 115 may receive a TA command from the base station 105), the UE 115 may implement the timing offset 320 for improved RACH preamble transmission reliability. By determining the transmission timing based on the timing offset 320, the UE 115 may reduce the likelihood—or avoid the possibility—that the RACH preamble reception 330 occurs in the previous slot N−1 305-*a* and collides with other transmissions in the previous slot N−1 305-*a*.

Figure 4:
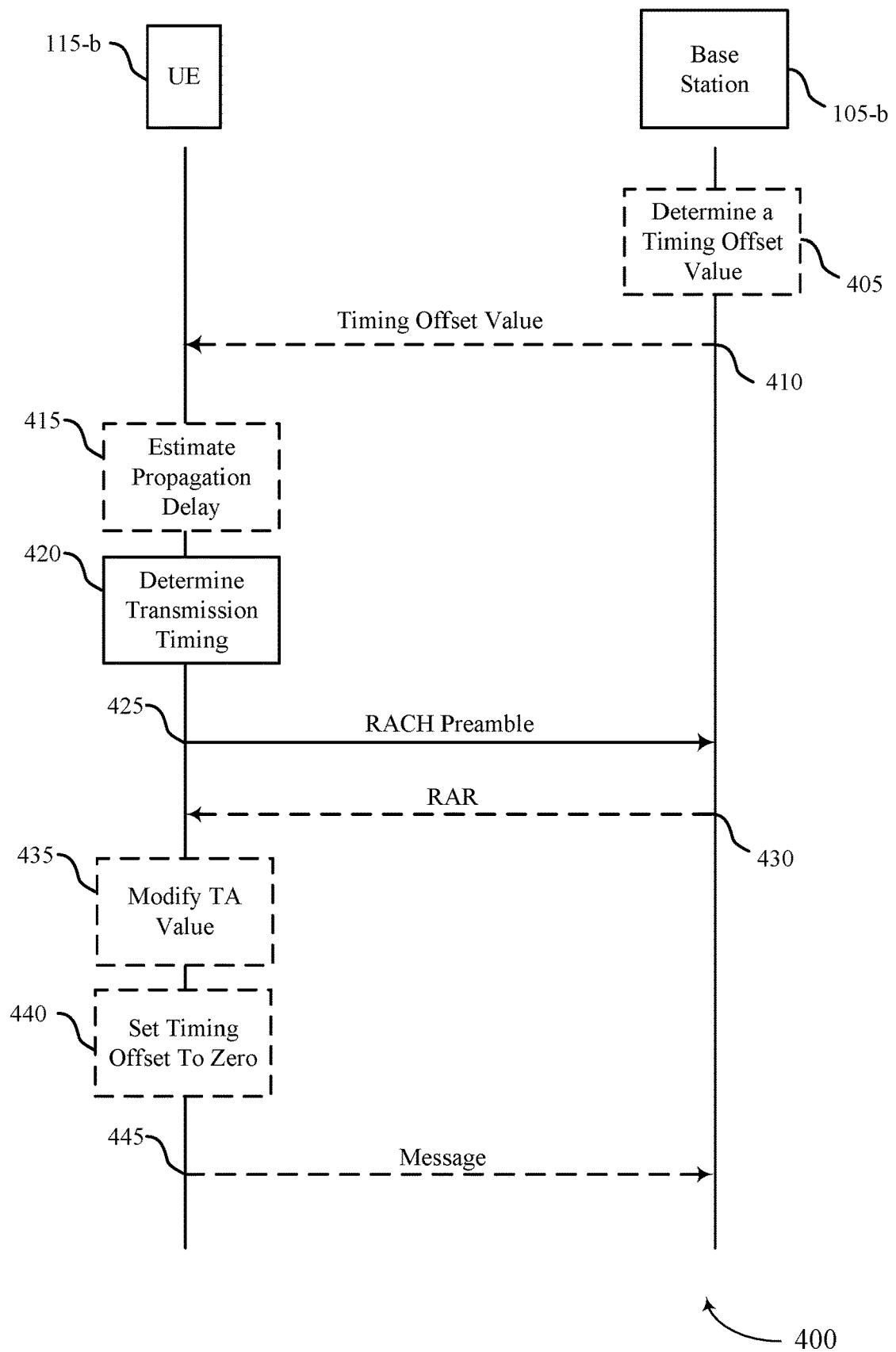
FIG. 4 illustrates an example of a process flow that supports a RACH preamble transmission timing offset, in accordance with one or more aspects of the present disclosure.

FIG. 4 illustrates an example of a process flow 400 that supports a RACH preamble transmission timing offset, in accordance with one or more aspects of the present disclosure. In some examples, the process flow 400 may implement aspects of a wireless communications systems 100 or 200, a processing timeline 300, or a combination thereof. The process flow 400 may include a UE 115 *b* and *a* base station 105-*b*, which may be examples of the corresponding devices described herein. In some cases, the UE 115 *b* and the base station 105-*b* may operate in an NTN. In some other cases, the UE 115 *b* and the base station 105 *b* may operate in another type of network (e.g., a terrestrial network, a network integrating terrestrial and NTN components, etc.). Alternative examples of the following may be implemented, where some processes are performed in a different order than described or are not performed at all. In some cases, processes may include additional features not mentioned below, or further processes may be added.

At 405, the base station 105-*b* may determine a transmission timing offset for RACH preamble transmissions. In some examples, the timing offset may be based on a timing accuracy of the UE 115-*b*. At 410, the base station 105-*b* may transmit the timing offset value to the UE 115-*b*. In some examples, the timing offset may be included in a SIB transmission (e.g., as a parameter defined in SIB1). The UE 115-*b* may monitor for broadcast system information in order to perform a RACH procedure.

At 415, the UE 115-*b* may estimate a propagation delay between the UE 115-*b* and the base station 105-*b*. In some examples, the propagation delay may be estimated based on receiving the system information from the base station 105-*b* or based on any other timing control techniques.

At 420, the UE 115-*b* may determine a transmission timing for transmission of a RACH preamble. In some examples, the transmission timing may be based on the timing offset received from the base station 105-*b*. In some other examples, the transmission timing may be based on a configured (e.g., pre-configured) value for RACH preamble transmission at the UE 115-*b*. In some cases, the transmission timing may be further based on the estimated propagation delay, system timing determined by a GNSS, or both. In some cases, determining the transmission timing may include determining a first timing value corresponding to a slot boundary, subtracting from the first timing value the propagation delay (e.g., advancing timing by the estimated propagation delay value), and adding the timing offset (e.g., backing off by the timing offset value). At 425, the UE 115-*b* may transmit a RACH preamble message to the base station 105-*b* according to the determined transmission timing. The RACH preamble message may be an example of a RACH Msg1 or a RACH MsgA (e.g., transmitted on a PRACH, PUSCH, or both).

At 430, the base station 105-*b* may transmit an RAR message to the UE 115-*b*. In some examples, the RAR message may be an example of a RACH Msg2 or a RACH MsgB. In some cases, the RAR message may include a TA value for the UE 115-*b* to use for subsequent transmissions.

At 435, the UE 115-*b* may modify the received TA value based on the timing offset. In some examples, modifying the received TA value may include subtracting the timing offset from the TA value. At 440, the UE 115-*b* may set the timing offset to zero such that the timing offset does not affect subsequent transmissions (e.g., on other channels). At 445, the UE 115-*b* may transmit a subsequent message (e.g., a subsequent RACH message, such as a RACH Msg3) to the base station 105-*b* based on the modified TA value.

Figure 5:
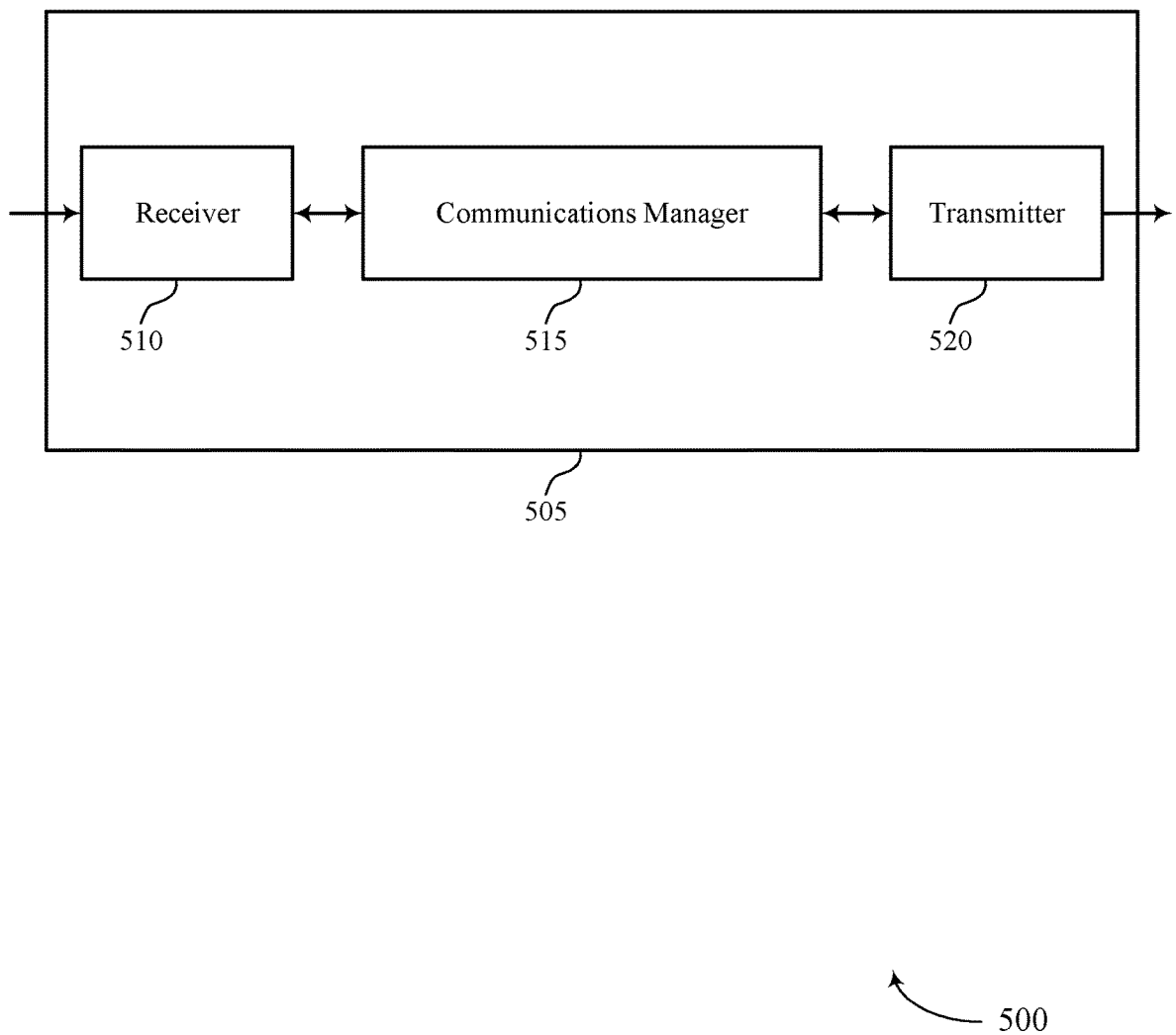
FIGS. 5 and 6 show block diagrams of devices that support a RACH preamble transmission timing offset, in accordance with one or more aspects of the present disclosure.

FIG. 5 shows a block diagram 500 of a device 505 that supports a RACH preamble transmission timing offset, in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to a RACH preamble transmission timing offset, etc.). Information may be passed on to other components of the device 505. The receiver 510 may be an example of aspects of the transceiver 820 described with reference to FIG. 8. The receiver 510 may utilize a single antenna or a set of antennas.

In some examples, the communications manager 515 may receive, from a base station, a system information message including a timing offset value, determine a transmission timing for a RACH preamble message based on the timing offset value, and transmit, to the base station, the RACH preamble message according to the transmission timing. Additionally or alternatively, the communications manager 515 may determine a timing offset value based on a configured value for RACH preamble transmission, determine a transmission timing for a RACH preamble message based on the timing offset value, and transmit, to a base station, the RACH preamble message according to the transmission timing. The communications manager 515 may be an example of aspects of the communications manager 810 or the communications manager 101 described herein.

The actions performed by the communications manager 515 as described herein may support improvements in communications. In one or more aspects, a UE 115 may determine transmission timing for a RACH preamble based on a timing offset value (e.g., configured by a base station or pre-configured at the UE 115). By implementing the timing offset value, the UE 115 may ensure that the RACH preamble arrives at a base station 105 at or after a slot boundary. This reception timing may avoid causing interference to communications (e.g., uplink transmissions) occurring in the previous slot. Further, the base station 105 may reliably receive and decode the RACH preamble message based on the reception timing. By receiving the RACH preamble after the slot boundary, the base station 105 may calculate a positive TA value, which the base station 105 may efficiently indicate to the UE 115 (e.g., without supporting negative TA values). However, in some examples, the base station 105 and the UE 115 may support negative TA values. Additionally or alternatively, by advancing timing of the RACH preamble transmission according to an estimated propagation delay (e.g., minus the timing offset), the UE 115 may reduce latency in RACH preamble transmission and improve reception at the base station 105, as the base station 105 may receive the RACH preamble message at or near the start of the slot.

Based on determining transmission timing for a RACH preamble according to a timing offset value, a processor of a UE 115 (e.g., a processor controlling the receiver 510, the communications manager 515, the transmitter 520, etc.) may reduce processing resources used for communications. For example, by ensuring the RACH preamble message arrives at the base station 105 at or after the slot boundary (e.g., the leading slot boundary), the UE 115 may mitigate collisions with communications in the previous slot and may reduce a number of retransmissions on one or more channels (e.g., the PRACH, the PUCCH, the PUSCH, or some combination of these channels). Reducing the number of retransmissions may reduce a number of times the processor ramps up processing power and turns on processing units to handle RACH preamble transmissions. Further, reducing the number of retransmissions may reduce channel overhead.

The communications manager 515 may be an example of means for performing various aspects of RACH preamble transmission. The communications manager 515, or its sub-components, may be implemented in hardware (e.g., in communications management circuitry). The circuitry may include a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

Additionally or alternatively, the communications manager 515, or its sub-components, may be implemented in code (e.g., as communications management software or firmware) executed by a processor, or any combination thereof. If implemented in code executed by a processor, the functions of the communications manager 515, or its sub-components, may be executed by a general-purpose processor, a DSP, an ASIC, an FPGA, or another programmable logic device.

In some examples, the communications manager 515 may be configured to perform various operations (e.g., receiving or transmitting) using or otherwise in cooperation with the receiver 510, the transmitter 520, or both.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
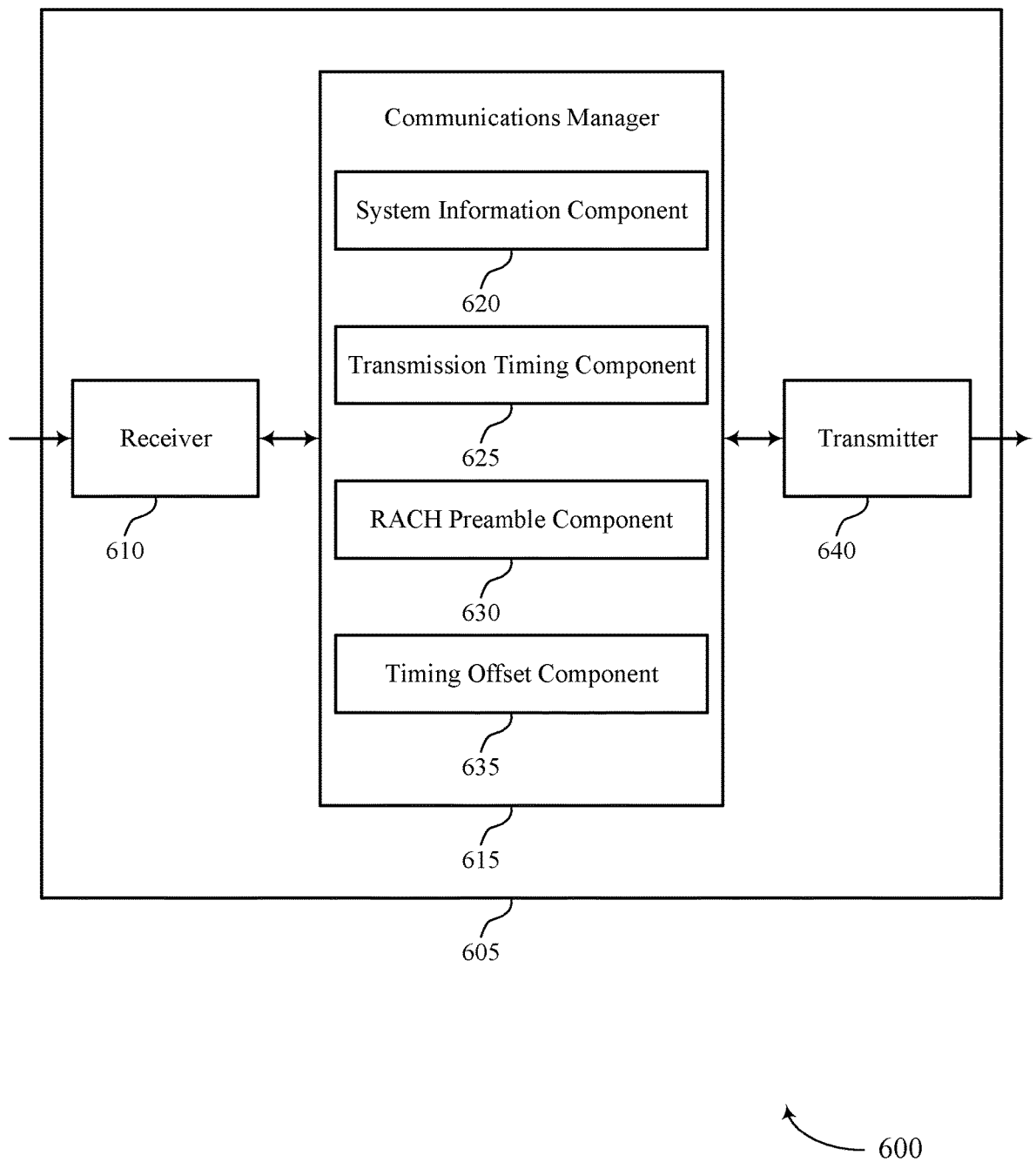

FIG. 6 shows a block diagram 600 of a device 605 that supports a RACH preamble transmission timing offset, in accordance with one or more aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to a RACH preamble transmission timing offset, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 or the communications manager 101 as described herein. The communications manager 615 may include a system information component 620, a transmission timing component 625, a RACH preamble component 630, a timing offset component 635, or a combination thereof. The communications manager 615 may be an example of aspects of the communications manager 810 described herein.

In some examples, the system information component 620 may receive, from a base station, a system information message including a timing offset value. The transmission timing component 625 may determine a transmission timing for a RACH preamble message based on the timing offset value. The RACH preamble component 630 may transmit, to the base station, the RACH preamble message according to the transmission timing.

In some other examples, the timing offset component 635 may determine a timing offset value based on a configured value for RACH preamble transmission. The transmission timing component 625 may determine a transmission timing for a RACH preamble message based on the timing offset value. The RACH preamble component 630 may transmit, to a base station, the RACH preamble message according to the transmission timing.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
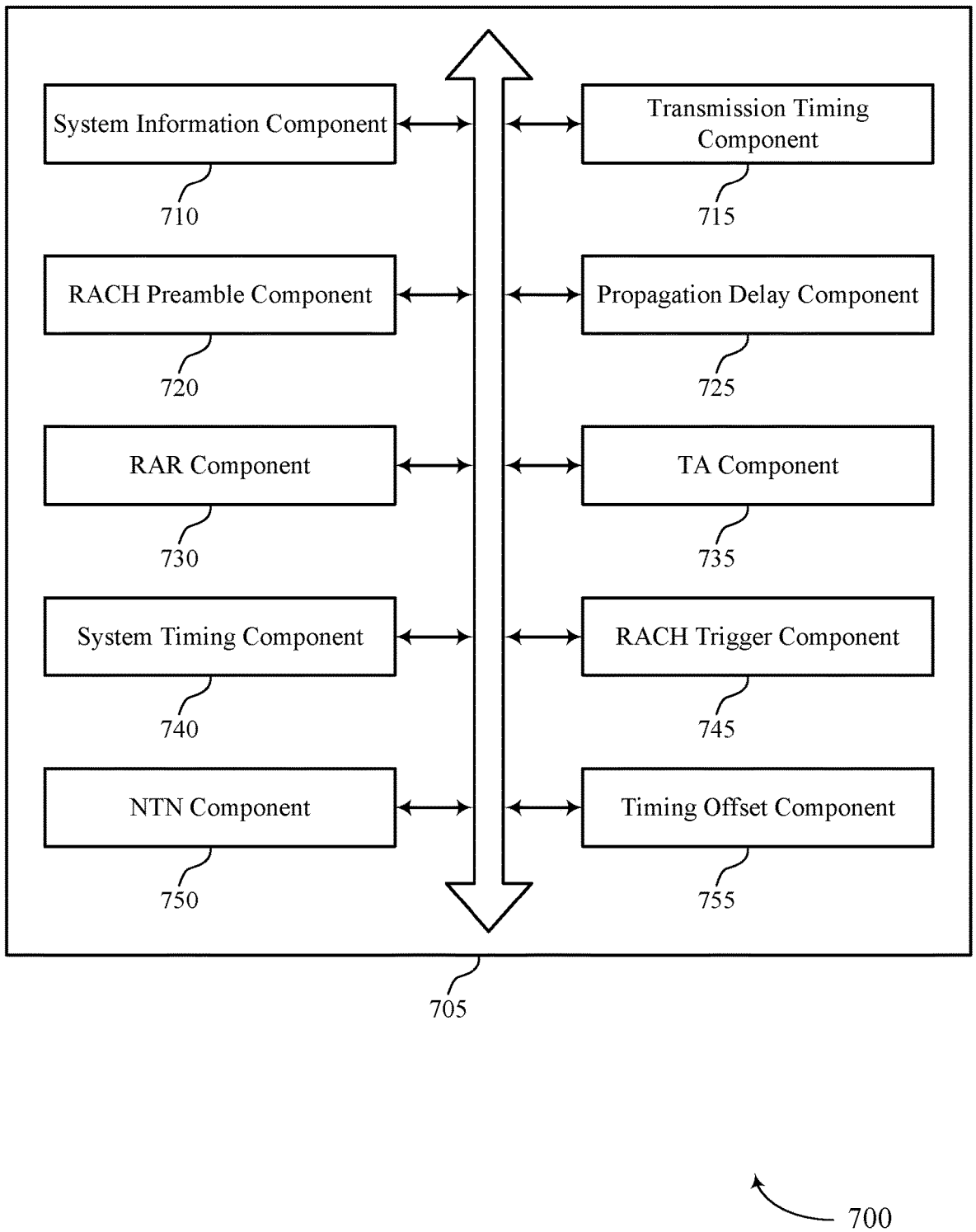
FIG. 7 shows a block diagram of a communications manager that supports a RACH preamble transmission timing offset, in accordance with one or more aspects of the present disclosure.

FIG. 7 shows a block diagram 700 of a communications manager 705 that supports a RACH preamble transmission timing offset, in accordance with one or more aspects of the present disclosure. The communications manager 705 may be an example of aspects of a communications manager 101, a communications manager 515, a communications manager 615, or a communications manager 810 described herein. The communications manager 705 may include a system information component 710, a transmission timing component 715, a RACH preamble component 720, a propagation delay component 725, an RAR component 730, a TA component 735, a system timing component 740, a RACH trigger component 745, an NTN component 750, a timing offset component 755, or a combination of these or other components. Each of these modules may communicate, directly or indirectly, with one another (e.g., via one or more buses).

In some implementations, the system information component 710 may receive, from a base station, a system information message including a timing offset value. In some cases, the system information message may be an example of a SIB1 including a field indicating the timing offset value. The timing offset value may be greater than zero.

The transmission timing component 715 may determine a transmission timing for a RACH preamble message based on the timing offset value. The RACH preamble component 720 may transmit, to the base station, the RACH preamble message according to the transmission timing. In some cases, the RACH preamble message may be an example of a RACH Msg1 for a four-step RACH procedure or a RACH MsgA for a two-step RACH procedure.

The propagation delay component 725 may estimate a propagation delay between the UE and the base station, where the transmission timing for the RACH preamble message may be further based on the estimated propagation delay. In some examples, determining the transmission timing for the RACH preamble message may involve the transmission timing component 715 determining a first timing value corresponding to a slot boundary of a slot for transmitting the RACH preamble message, subtracting, from the first timing value, the estimated propagation delay to obtain a second timing value, and adding, to the second timing value, the timing offset value to obtain the transmission timing for the RACH preamble message. The transmission timing for the RACH preamble message may precede the first timing value corresponding to the slot boundary of the slot for transmitting the RACH preamble message.

The RAR component 730 may receive, from the base station and in response to the RACH preamble message, an RAR message including a TA value. The TA value may be based on the transmission timing. The TA component 735 may modify the TA value based on the timing offset value and may transmit, to the base station, a subsequent message according to the modified TA value. In some examples, the RAR component 730 may set the timing offset value to zero based on receiving the RAR message including the TA value, where the subsequent message is transmitted based on the timing offset value being set to zero. In some examples, modifying the TA value may involve the TA component 735 subtracting the timing offset value from the TA value to obtain the modified TA value. In some cases, the RAR message may be an example of a RACH Msg2 for a four-step RACH procedure or a RACH MsgB for a two-step RACH procedure. The TA value may be greater than zero.

The system timing component 740 may determine a system timing for the base station, where the transmission timing for the RACH preamble message is further based on the system timing. In some cases, the system timing may be determined based on a GNSS.

In some examples, the system information component 710 may receive, from the base station, a second system information message including a second timing offset value different from the first timing offset value. The RACH trigger component 745 may trigger a RACH procedure with the base station, and the RACH preamble component 720 may transmit, to the base station, a second RACH preamble message for the triggered RACH procedure based on the second timing offset value.

The NTN component 750 may operate in an NTN, where determining the transmission timing for the RACH preamble message based on the timing offset value is further based on operating in the NTN.

In some other implementations, the timing offset component 755 may determine a timing offset value based on a configured value for RACH preamble transmission. In some examples, the timing offset component 755 may receive a configuration message indicating the configured value for RACH preamble transmission. In some other examples, the configured value for RACH preamble transmission may be pre-configured at the UE. The configured value for RACH preamble transmission may be greater than zero.

The transmission timing component 715 may determine a transmission timing for a RACH preamble message based on the timing offset value. The RACH preamble component 720 may transmit, to a base station, the RACH preamble message according to the transmission timing.

The RAR component 730 may receive, from the base station and in response to the RACH preamble message, an RAR message including a TA value. The TA value may be based on the transmission timing. The TA component 735 may modify the TA value based on the timing offset value and may transmit, to the base station, a subsequent message according to the modified TA value.

In some examples, the timing offset component 755 may set the timing offset value to zero based on receiving the RAR message including the TA value, where the subsequent message is transmitted based on the timing offset value being set to zero. In some cases, the RACH trigger component 745 may trigger a RACH procedure, and the timing offset component 755 may reset the timing offset value to the configured value for RACH preamble transmission based on the triggered RACH procedure.

In some examples, the propagation delay component 725 may estimate a propagation delay between the UE and the base station, and the system timing component 740 may determine a system timing for the base station, where the transmission timing for the RACH preamble message may be further based on the estimated propagation delay or the system timing or both.

The NTN component 750 may operate in an NTN, where determining the transmission timing for the RACH preamble message based on the timing offset value may be further based on operating in the NTN.

Figure 8:
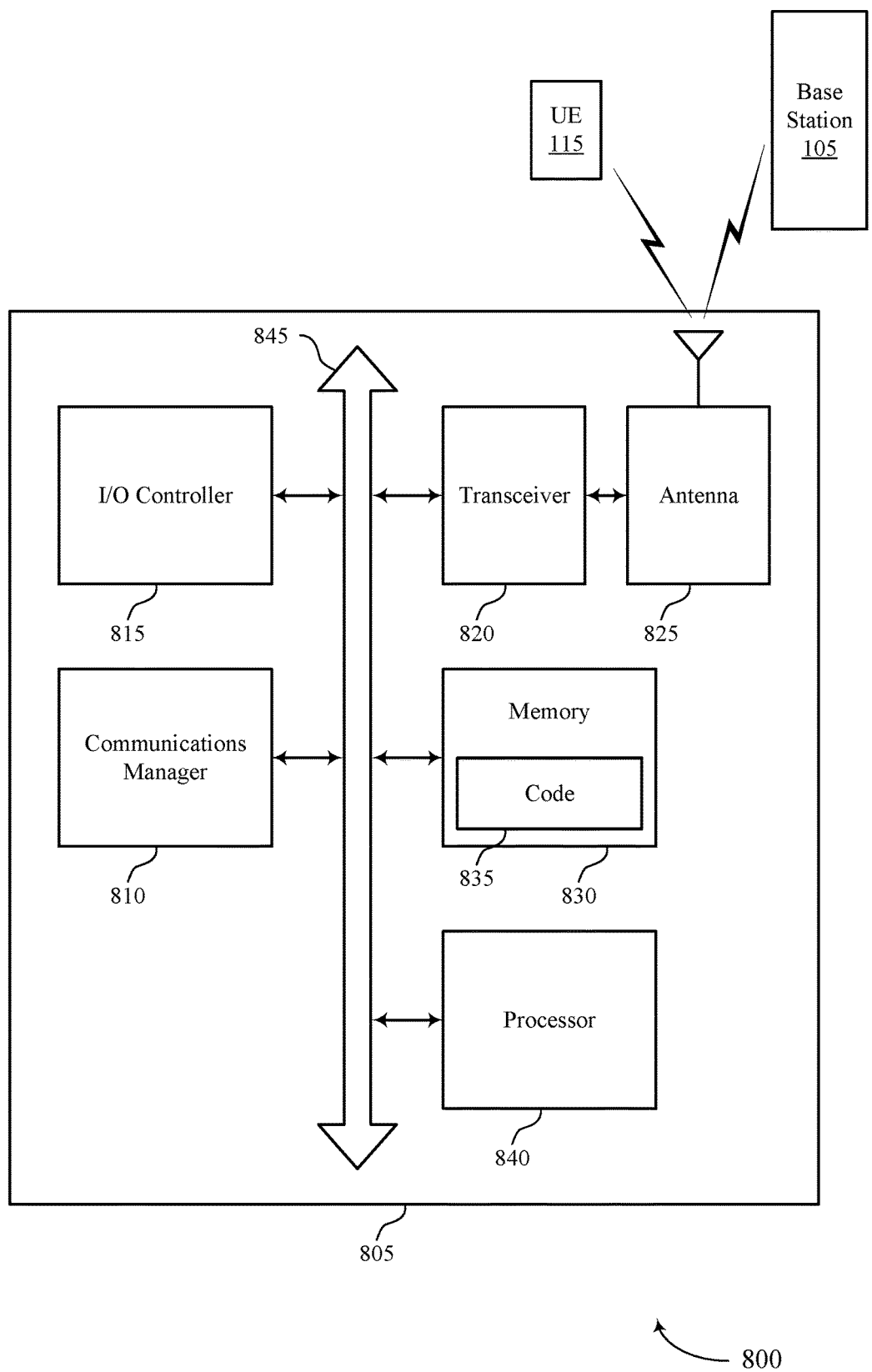
FIG. 8 shows a diagram of a system including a device that supports a RACH preamble transmission timing offset, in accordance with one or more aspects of the present disclosure.

FIG. 8 shows a diagram of a system 800 including a device 805 that supports a RACH preamble transmission timing offset, in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some examples, the communications manager 810 may receive, from a base station, a system information message including a timing offset value, determine a transmission timing for a RACH preamble message based on the timing offset value, and transmit, to the base station, the RACH preamble message according to the transmission timing. Additionally or alternatively, the communications manager 810 may determine a timing offset value based on a configured value for RACH preamble transmission, determine a transmission timing for a RACH preamble message based on the timing offset value, and transmit, to a base station, the RACH preamble message according to the transmission timing.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting a RACH preamble transmission timing offset).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
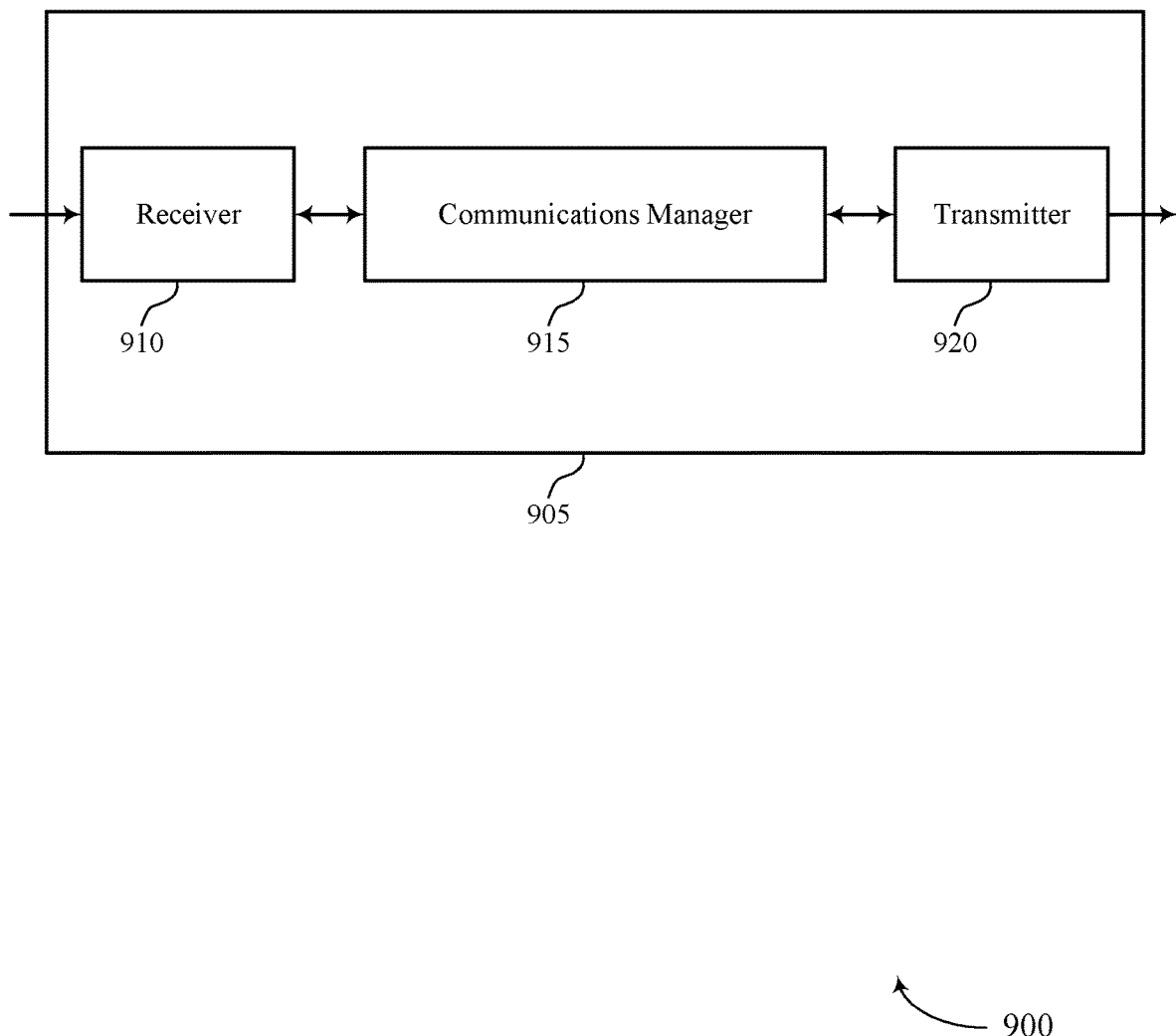
FIGS. 9 and 10 show block diagrams of devices that support a RACH preamble transmission timing offset, in accordance with one or more aspects of the present disclosure.

FIG. 9 shows a block diagram 900 of a device 905 that supports a RACH preamble transmission timing offset, in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to a RACH preamble transmission timing offset, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a system information message including a timing offset value and receive, from the UE, a RACH preamble message based on the timing offset value. The communications manager 915 may be an example of aspects of the communications manager 1210 or the communications manager 102 described herein.

The communications manager 915 may be an example of means for performing various aspects of RACH preamble reception. The communications manager 915 or its sub-components may be implemented in hardware (e.g., in communications management circuitry). The circuitry may include a processor, a DSP, an ASIC, an FPGA or other programmable logic device, discrete gate or transistor logic, discrete hardware components, or any combination thereof designed to perform the functions described in the present disclosure.

Additionally or alternatively, the communications manager 915, or its sub-components, may be implemented in code (e.g., as communications management software or firmware) executed by a processor, or any combination thereof. If implemented in code executed by a processor, the functions of the communications manager 915, or its sub-components, may be executed by a general-purpose processor, a DSP, an ASIC, an FPGA, or another programmable logic device.

In some examples, the communications manager 915 may be configured to perform various operations (e.g., receiving or transmitting) using or otherwise in cooperation with the receiver 910, the transmitter 920, or both.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
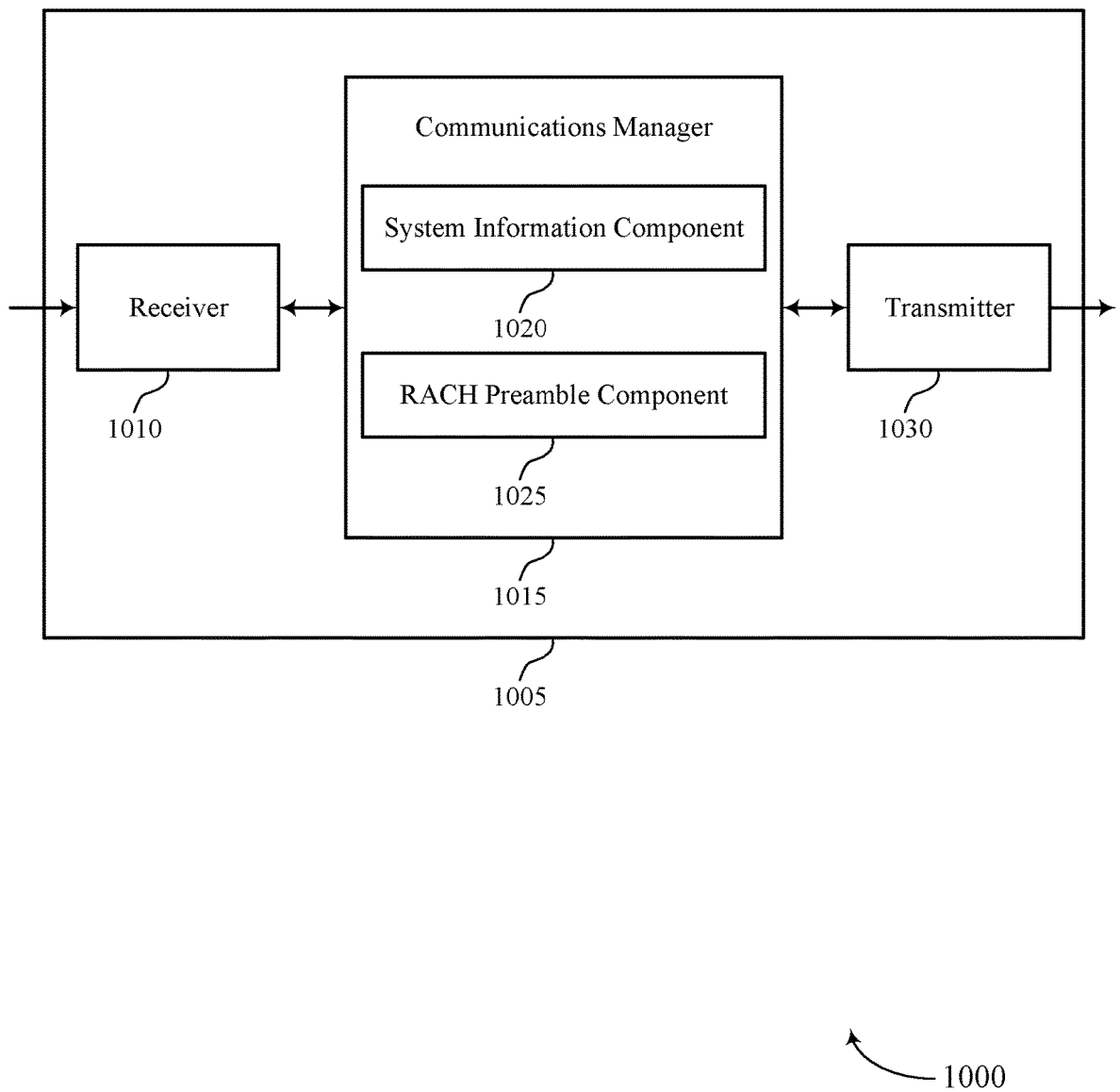

FIG. 10 shows a block diagram 1000 of a device 1005 that supports a RACH preamble transmission timing offset, in accordance with one or more aspects of the present disclosure. The device 1005 may be an example of aspects of a device 905 or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to a RACH preamble transmission timing offset, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 or the communications manager 102 as described herein. The communications manager 1015 may include a system information component 1020 and a RACH preamble component 1025. The communications manager 1015 may be an example of aspects of the communications manager 1210 described herein.

The system information component 1020 may transmit, to a UE, a system information message including a timing offset value. The RACH preamble component 1025 may receive, from the UE, a RACH preamble message based on the timing offset value.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
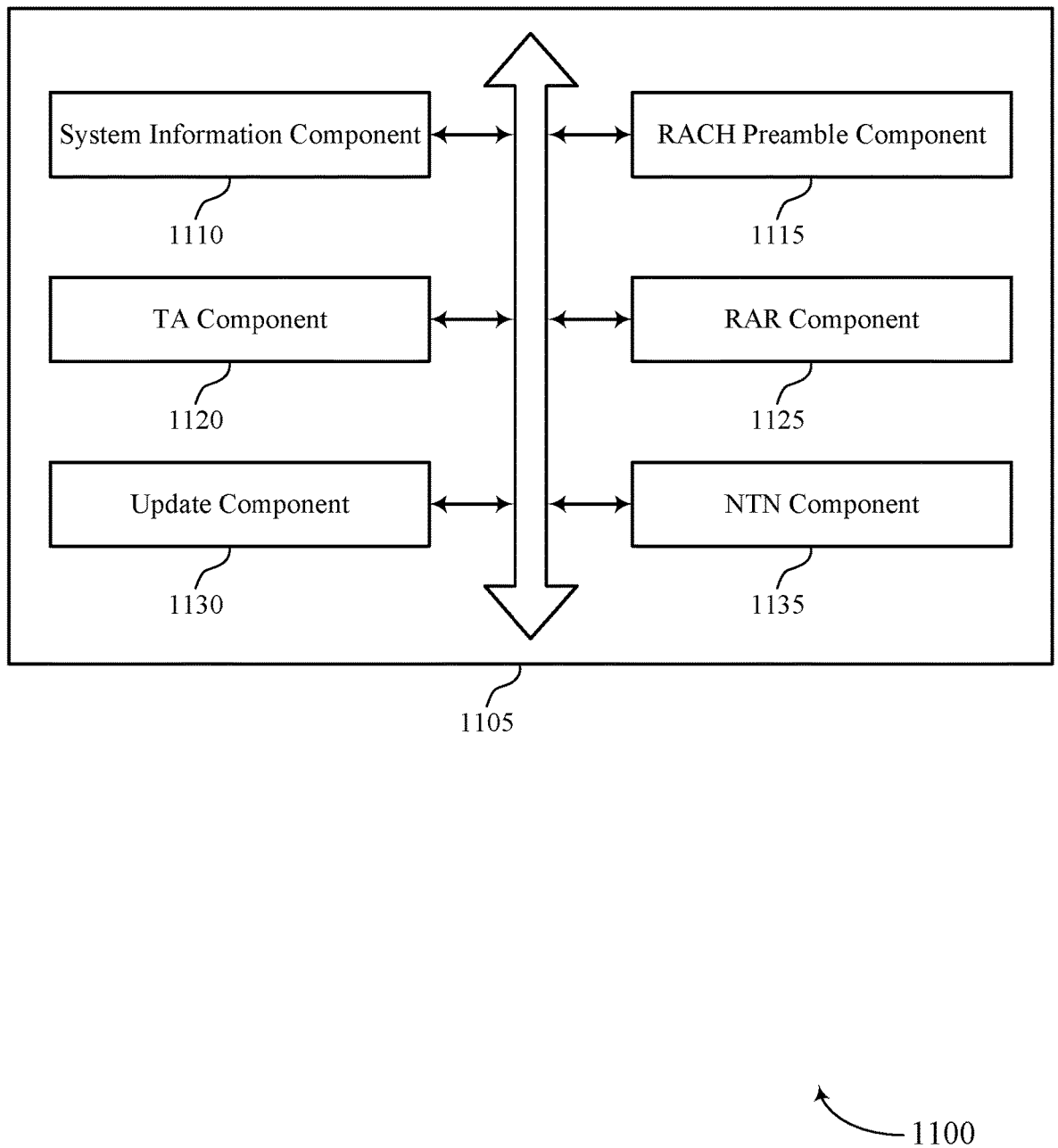
FIG. 11 shows a block diagram of a communications manager that supports a RACH preamble transmission timing offset, in accordance with one or more aspects of the present disclosure.

FIG. 11 shows a block diagram 1100 of a communications manager 1105 that supports a RACH preamble transmission timing offset, in accordance with one or more aspects of the present disclosure. The communications manager 1105 may be an example of aspects of a communications manager 102, a communications manager 915, a communications manager 1015, or a communications manager 1210 described herein. The communications manager 1105 may include a system information component 1110, a RACH preamble component 1115, a TA component 1120, an RAR component 1125, an update component 1130, an NTN component 1135, or any combination of these or other components. Each of these modules may communicate, directly or indirectly, with one another (e.g., via one or more buses).

The system information component 1110 may transmit, to a UE, a system information message including a timing offset value. In some cases, the system information message may be transmitted to a set of multiple UEs including the UE. In some cases, the system information message may be an example of a SIB1 including a field indicating the timing offset value. The timing offset value may be greater than zero.

The RACH preamble component 1115 may receive, from the UE, a RACH preamble message based on the timing offset value. In some cases, the RACH preamble message may be an example of a RACH Msg1 for a four-step RACH procedure or a RACH MsgA for a two-step RACH procedure.

The TA component 1120 may determine a TA value based on a reception time for receiving the RACH preamble message. The RAR component 1125 may transmit, to the UE and in response to the RACH preamble message, an RAR message including the TA value.

In some examples, the TA component 1120 may receive, from the UE, a subsequent message based on the TA value and the timing offset value, determine an updated TA value based on a reception time for receiving the subsequent message, and transmit, to the UE, an indication of the updated TA value. In some cases, the RAR message may be an example of a RACH Msg2 for a four-step RACH procedure or a RACH MsgB for a two-step RACH procedure. The TA value may be greater than zero.

In some cases, the reception time for receiving the RACH preamble message may be based on the timing offset value. Additionally or alternatively, the reception time for receiving the RACH preamble message may be further based on an estimated propagation delay between the UE and the base station or an estimated system timing or both. The reception time for receiving the RACH preamble message may be subsequent to a slot boundary of a slot for receiving the RACH preamble message.

The update component 1130 may update the timing offset value and the system information component 1110 may transmit, to the UE, a second system information message including the updated timing offset value.

The NTN component 1135 may operate in an NTN, where transmitting the system information message including the timing offset value may be based on operating in the NTN.

Figure 12:
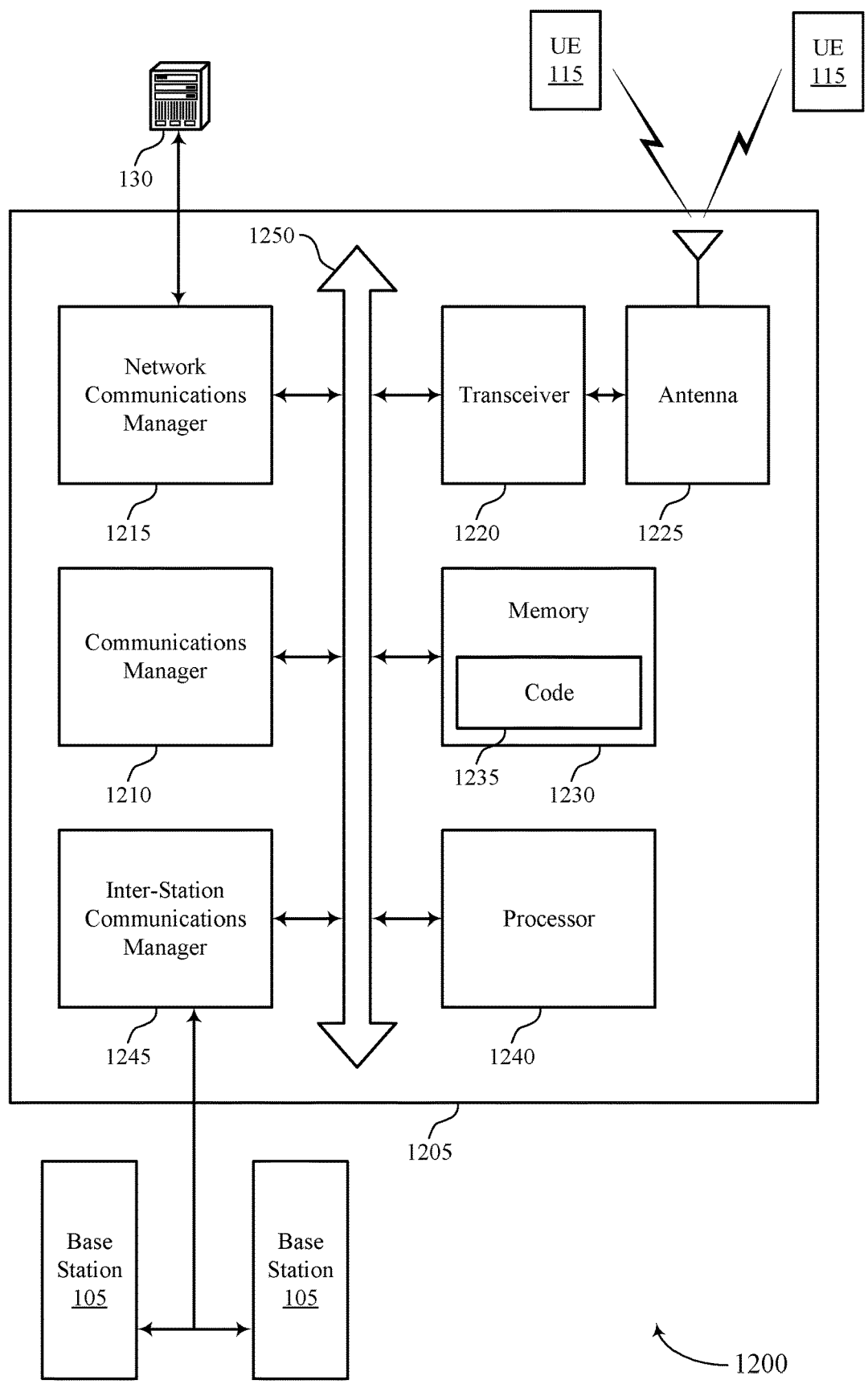
FIG. 12 shows a diagram of a system including a device that supports a RACH preamble transmission timing offset, in accordance with one or more aspects of the present disclosure.

FIG. 12 shows a diagram of a system 1200 including a device 1205 that supports a RACH preamble transmission timing offset, in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a system information message including a timing offset value and receive, from the UE, a RACH preamble message based on the timing offset value.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting a RACH preamble transmission timing offset).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
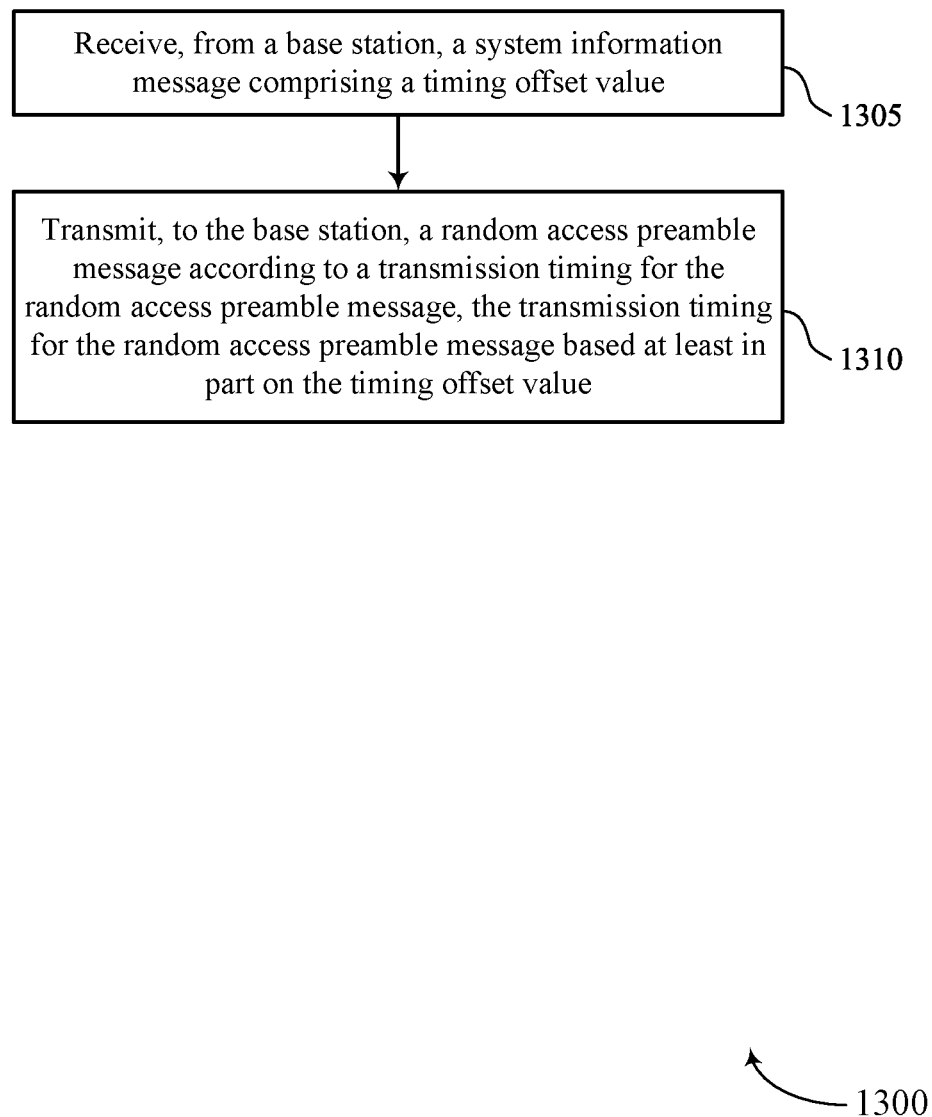
FIGS. 13 through 22 show flowcharts illustrating methods that support a RACH preamble transmission timing offset, in accordance with one or more aspects of the present disclosure.

FIG. 13 shows a flowchart illustrating a method 1300 that supports a RACH preamble transmission timing offset, in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a system information message including a timing offset value. The operations of 1305 may be performed in accordance with examples as disclosed herein. In some examples, aspects of the operations of 1305 may be performed by a system information component 710 as described with reference to FIG. 7.

At 1310, the method may include transmitting, to the base station, a RACH preamble message according to a transmission timing for the RACH preamble message, the transmission timing for the RACH preamble message based on the timing offset value. The operations of 1310 may be performed in accordance with examples as disclosed herein. In some examples, aspects of the operations of 1310 may be performed by a RACH preamble component 720 as described with reference to FIG. 7.

Figure 14:
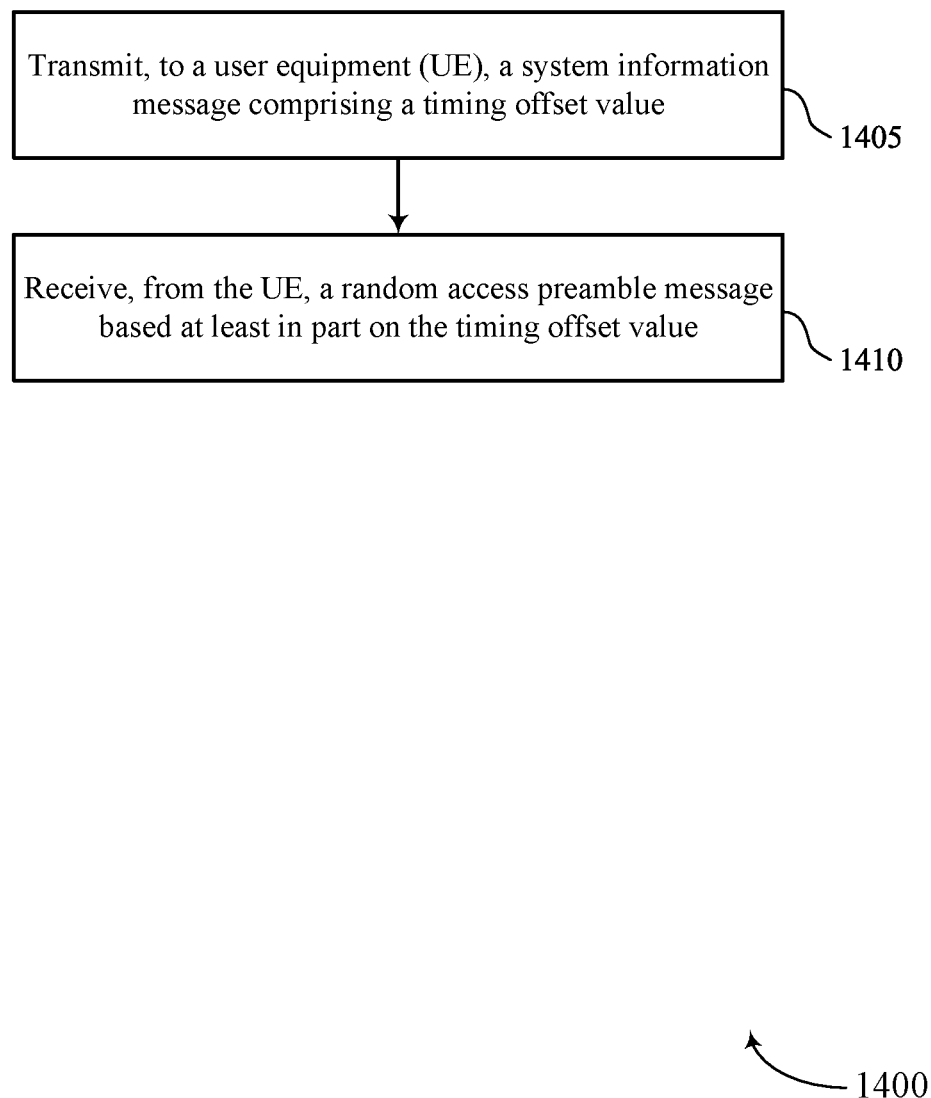

FIG. 14 shows a flowchart illustrating a method 1400 that supports a RACH preamble transmission timing offset, in accordance with one or more aspects of the present disclosure. The operations of the method 1400 may be implemented by a base station or its components as described herein. For example, the operations of the method 1400 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, a system information message including a timing offset value. The operations of 1405 may be performed in accordance with examples as disclosed herein. In some examples, aspects of the operations of 1405 may be performed by a system information component 1110 as described with reference to FIG. 11.

At 1410, the method may include receiving, from the UE, a RACH preamble message based on the timing offset value. The operations of 1410 may be performed in accordance with examples as disclosed herein. In some examples, aspects of the operations of 1410 may be performed by a RACH preamble component 1115 as described with reference to FIG. 11.

Figure 15:
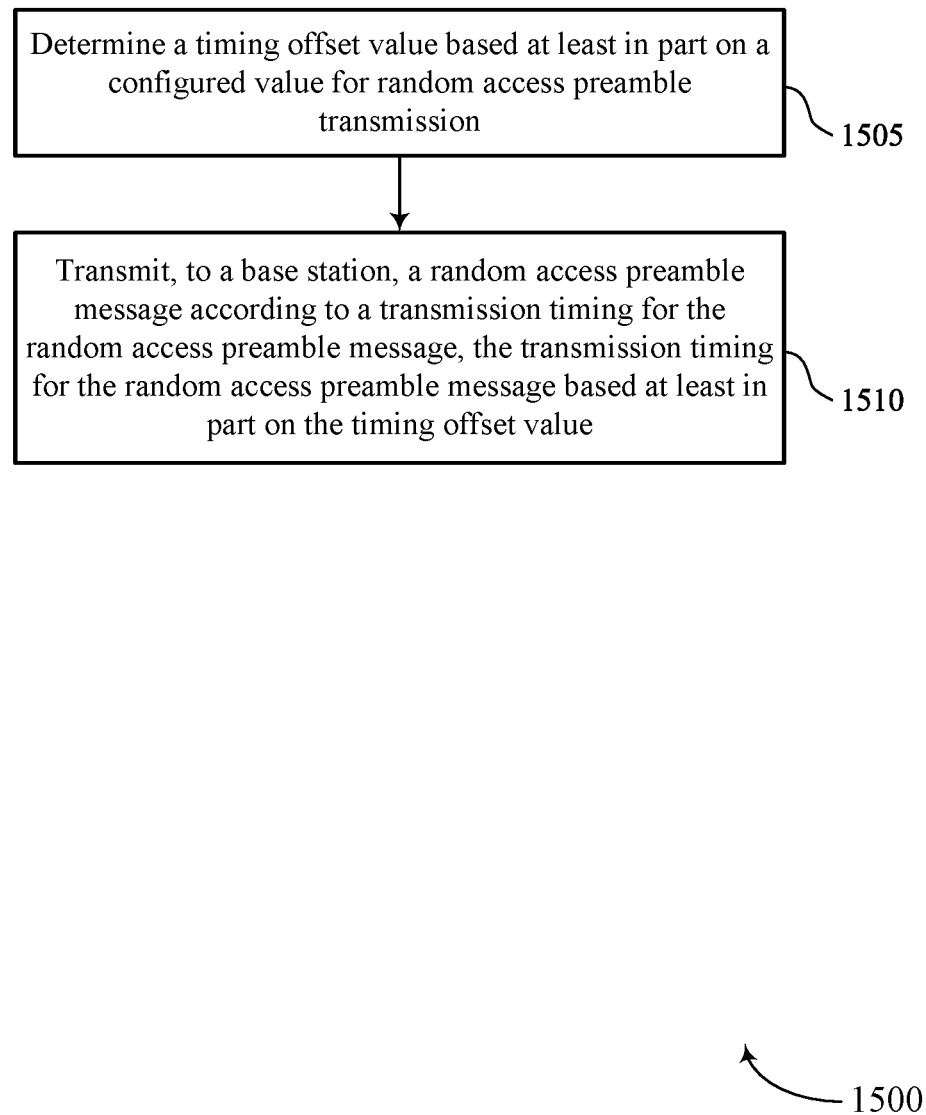

FIG. 15 shows a flowchart illustrating a method 1500 that supports a RACH preamble transmission timing offset, in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include determining a timing offset value based on a configured value for RACH preamble transmission. The operations of 1505 may be performed in accordance with examples as disclosed herein. In some examples, aspects of the operations of 1505 may be performed by a timing offset component 755 as described with reference to FIG. 7.

At 1510, the method may include transmitting, to a base station, a RACH preamble message according to a transmission timing for the RACH preamble message, the transmission timing for the RACH preamble message based on the timing offset value. The operations of 1510 may be performed in accordance with examples as disclosed herein. In some examples, aspects of the operations of 1510 may be performed by a RACH preamble component 720 as described with reference to FIG. 7.

Figure 16:
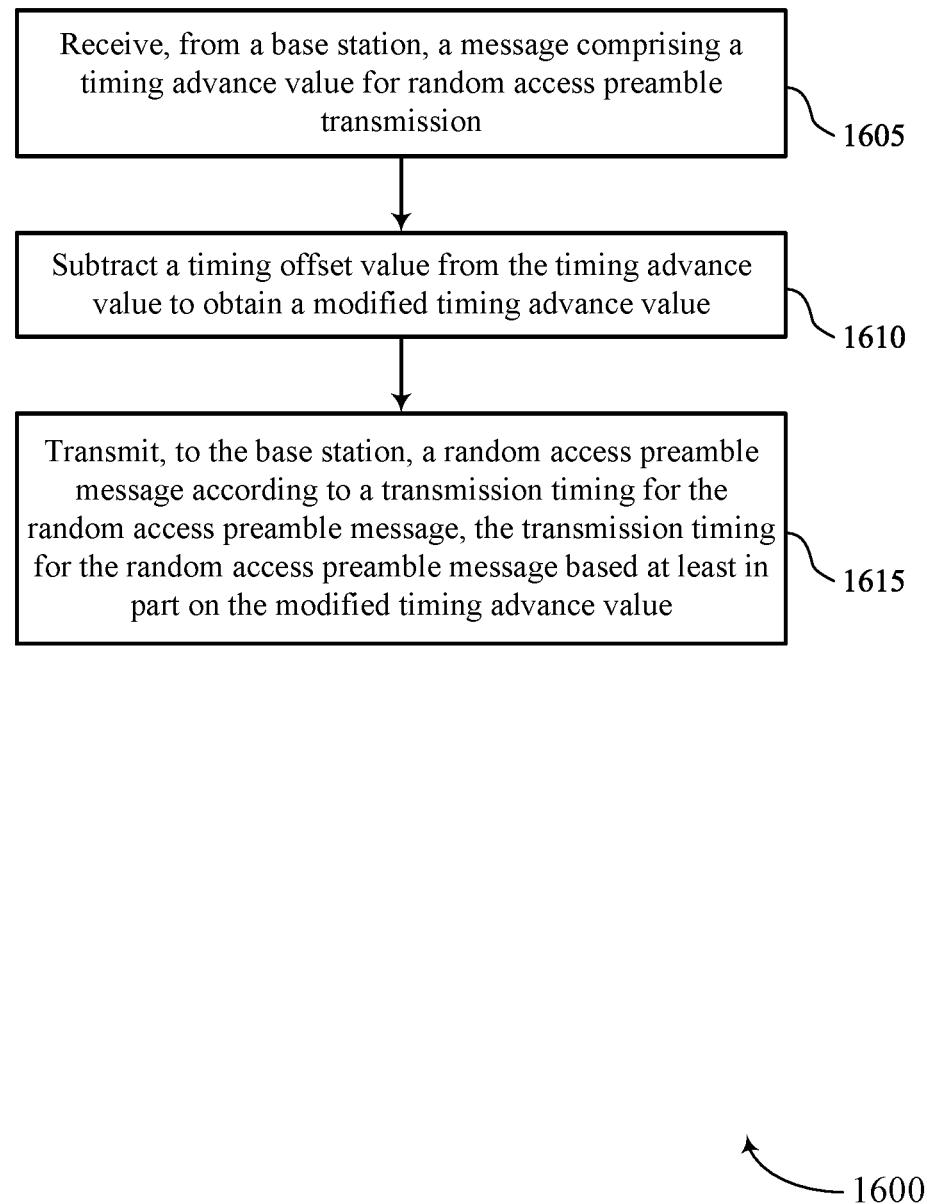

FIG. 16 shows a flowchart illustrating a method 1600 that supports a RACH preamble transmission timing offset, in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a message including a TA value for RACH preamble transmission. The operations of 1605 may be performed in accordance with examples as disclosed herein. In some examples, aspects of the operations of 1605 may be performed by a TA component 735 as described with reference to FIG. 7.

At 1610, the method may include subtracting a timing offset value from the TA value to obtain a modified TA value. The operations of 1610 may be performed in accordance with examples as disclosed herein. In some examples, aspects of the operations of 1610 may be performed by a timing offset component 755 as described with reference to FIG. 7.

At 1615, the method may include transmitting, to the base station, a RACH preamble message according to a transmission timing for the RACH preamble message, the transmission timing for the RACH preamble message based on the modified TA value. The operations of 1615 may be performed in accordance with examples as disclosed herein. In some examples, aspects of the operations of 1615 may be performed by a RACH preamble component 720 as described with reference to FIG. 7.

Figure 17:
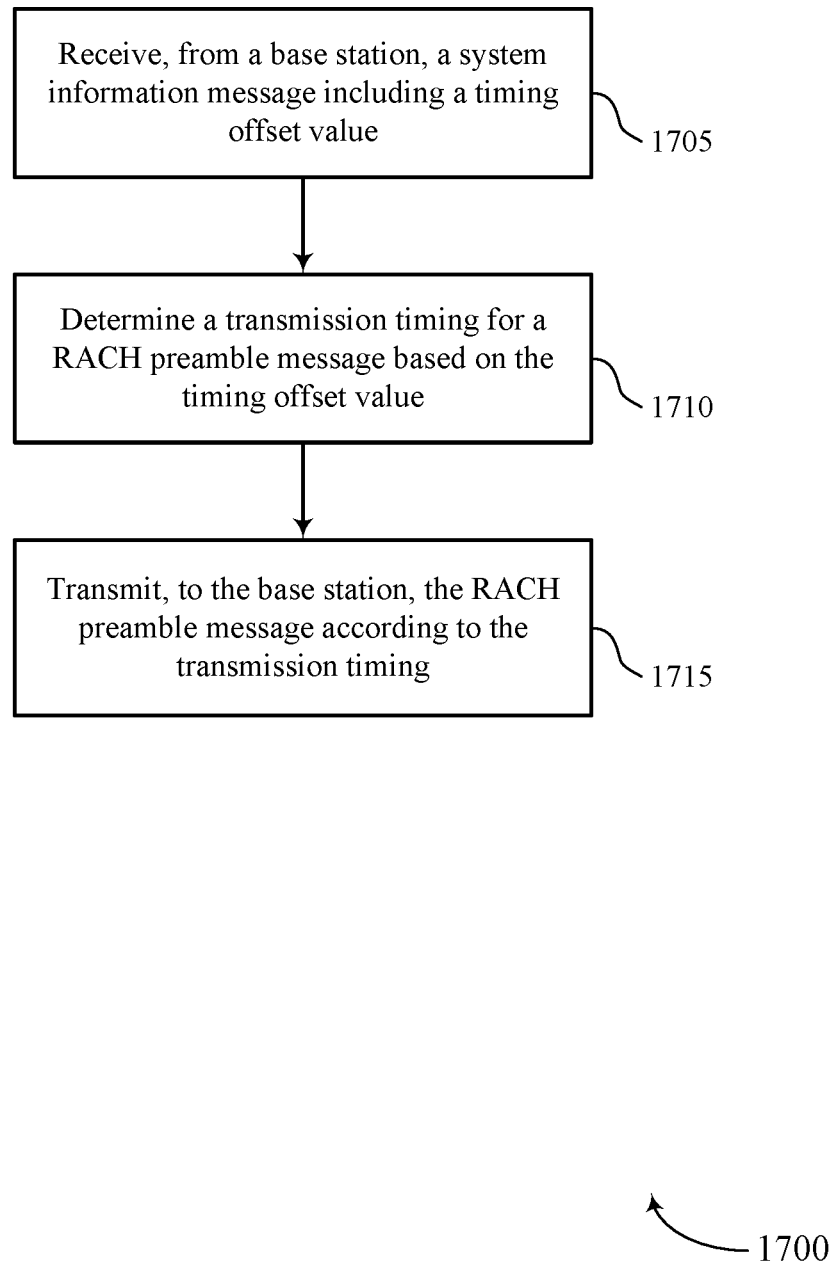

FIG. 17 shows a flowchart illustrating a method 1700 that supports a RACH preamble transmission timing offset, in accordance with one or more aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a system information message including a timing offset value. The operations of 1705 may be performed according to the methods described herein. In some examples, aspects of the operations of 1705 may be performed by a system information component as described with reference to FIGS. 5 through 8.

At 1710, the UE may determine a transmission timing for a RACH preamble message based on the timing offset value. The operations of 1710 may be performed according to the methods described herein. In some examples, aspects of the operations of 1710 may be performed by a transmission timing component as described with reference to FIGS. 5 through 8.

At 1715, the UE may transmit, to the base station, the RACH preamble message according to the transmission timing. The operations of 1715 may be performed according to the methods described herein. In some examples, aspects of the operations of 1715 may be performed by a RACH preamble component as described with reference to FIGS. 5 through 8.

Figure 18:
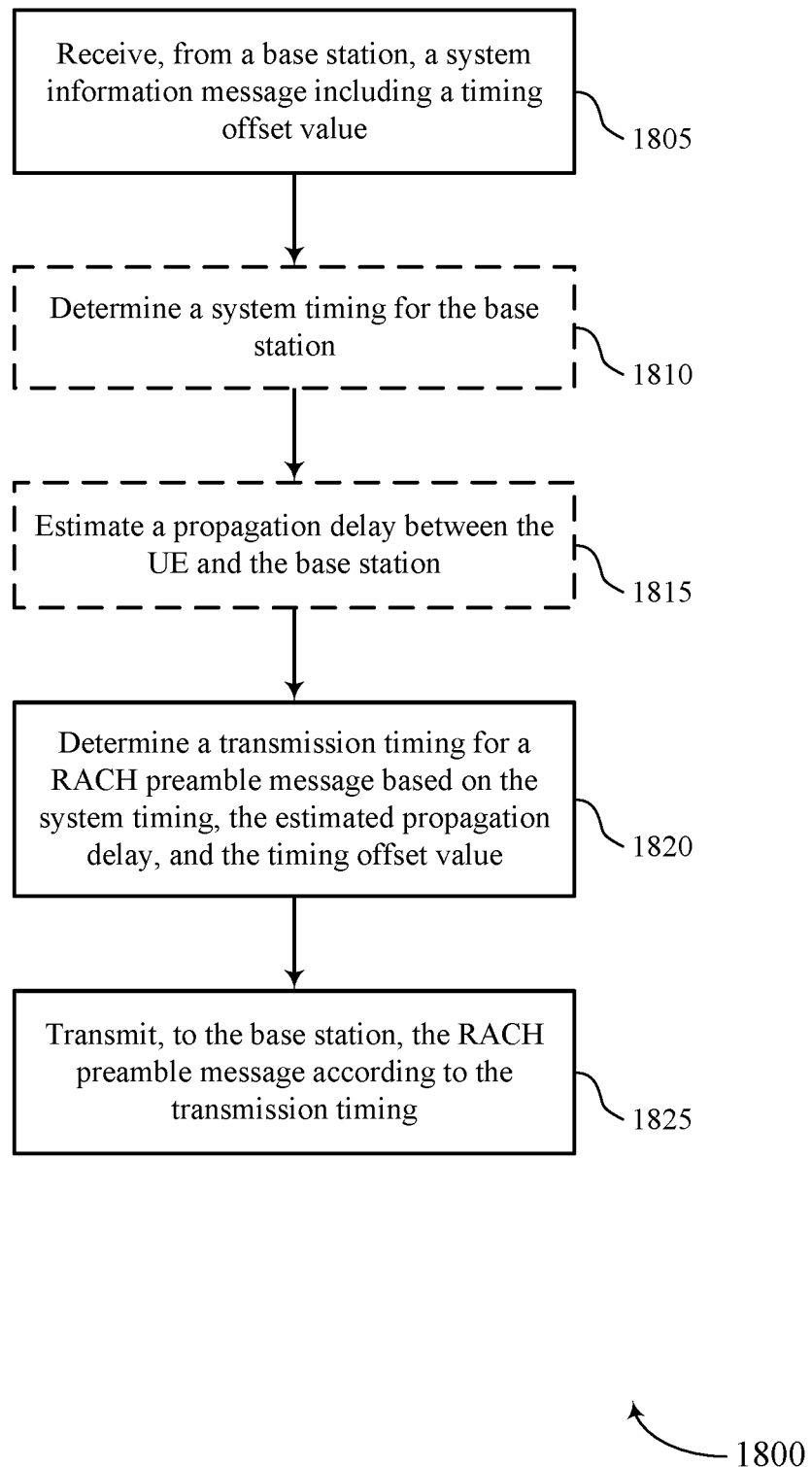

FIG. 18 shows a flowchart illustrating a method 1800 that supports a RACH preamble transmission timing offset, in accordance with one or more aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a system information message including a timing offset value. The operations of 1805 may be performed according to the methods described herein. In some examples, aspects of the operations of 1805 may be performed by a system information component as described with reference to FIGS. 5 through 8.

At 1810, the UE may determine a system timing for the base station. The operations of 1810 may be performed according to the methods described herein. In some examples, aspects of the operations of 1810 may be performed by a system timing component as described with reference to FIGS. 5 through 8.

At 1815, the UE may estimate a propagation delay between the UE and the base station. The operations of 1815 may be performed according to the methods described herein. In some examples, aspects of the operations of 1815 may be performed by a propagation delay component as described with reference to FIGS. 5 through 8.

At 1820, the UE may determine a transmission timing for a RACH preamble message based on the system timing, the estimated propagation delay, and the timing offset value. The operations of 1820 may be performed according to the methods described herein. In some examples, aspects of the operations of 1820 may be performed by a transmission timing component as described with reference to FIGS. 5 through 8.

At 1825, the UE may transmit, to the base station, the RACH preamble message according to the transmission timing. The operations of 1825 may be performed according to the methods described herein. In some examples, aspects of the operations of 1825 may be performed by a RACH preamble component as described with reference to FIGS. 5 through 8.

Figure 19:
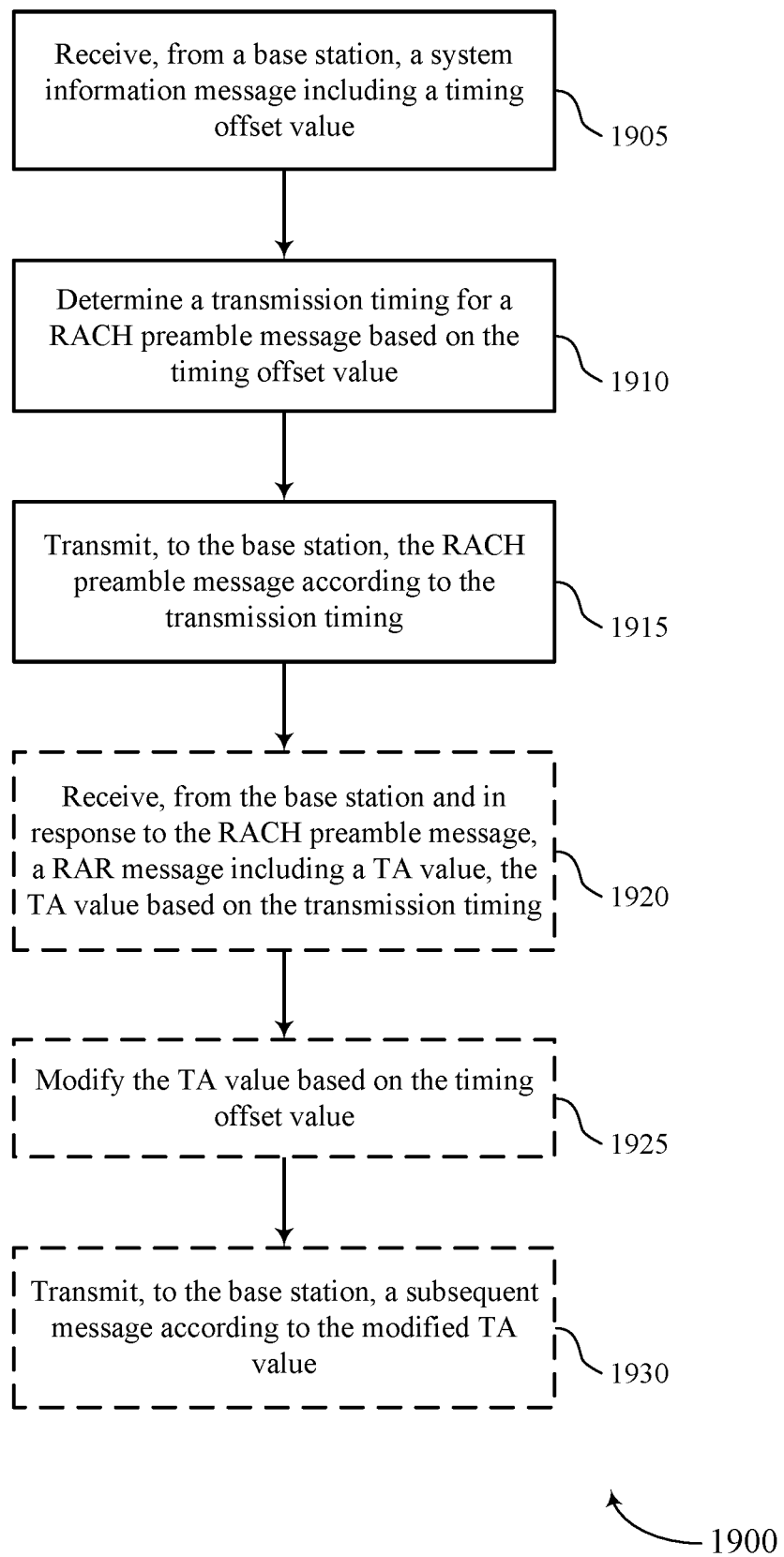

FIG. 19 shows a flowchart illustrating a method 1900 that supports a RACH preamble transmission timing offset, in accordance with one or more aspects of the present disclosure. The operations of method 1900 may be implemented by a UE 115 or its components as described herein. For example, the operations of method 1900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a system information message including a timing offset value. The operations of 1905 may be performed according to the methods described herein. In some examples, aspects of the operations of 1905 may be performed by a system information component as described with reference to FIGS. 5 through 8.

At 1910, the UE may determine a transmission timing for a RACH preamble message based on the timing offset value. The operations of 1910 may be performed according to the methods described herein. In some examples, aspects of the operations of 1910 may be performed by a transmission timing component as described with reference to FIGS. 5 through 8.

At 1915, the UE may transmit, to the base station, the RACH preamble message according to the transmission timing. The operations of 1915 may be performed according to the methods described herein. In some examples, aspects of the operations of 1915 may be performed by a RACH preamble component as described with reference to FIGS. 5 through 8.

At 1920, the UE may receive, from the base station and in response to the RACH preamble message, an RAR message including a TA value, the TA value based on the transmission timing. The operations of 1920 may be performed according to the methods described herein. In some examples, aspects of the operations of 1920 may be performed by an RAR component as described with reference to FIGS. 5 through 8.

At 1925, the UE may modify the TA value based on the timing offset value. The operations of 1925 may be performed according to the methods described herein. In some examples, aspects of the operations of 1925 may be performed by a TA component as described with reference to FIGS. 5 through 8.

At 1930, the UE may transmit, to the base station, a subsequent message according to the modified TA value. The operations of 1930 may be performed according to the methods described herein. In some examples, aspects of the operations of 1930 may be performed by a TA component as described with reference to FIGS. 5 through 8.

Figure 20:
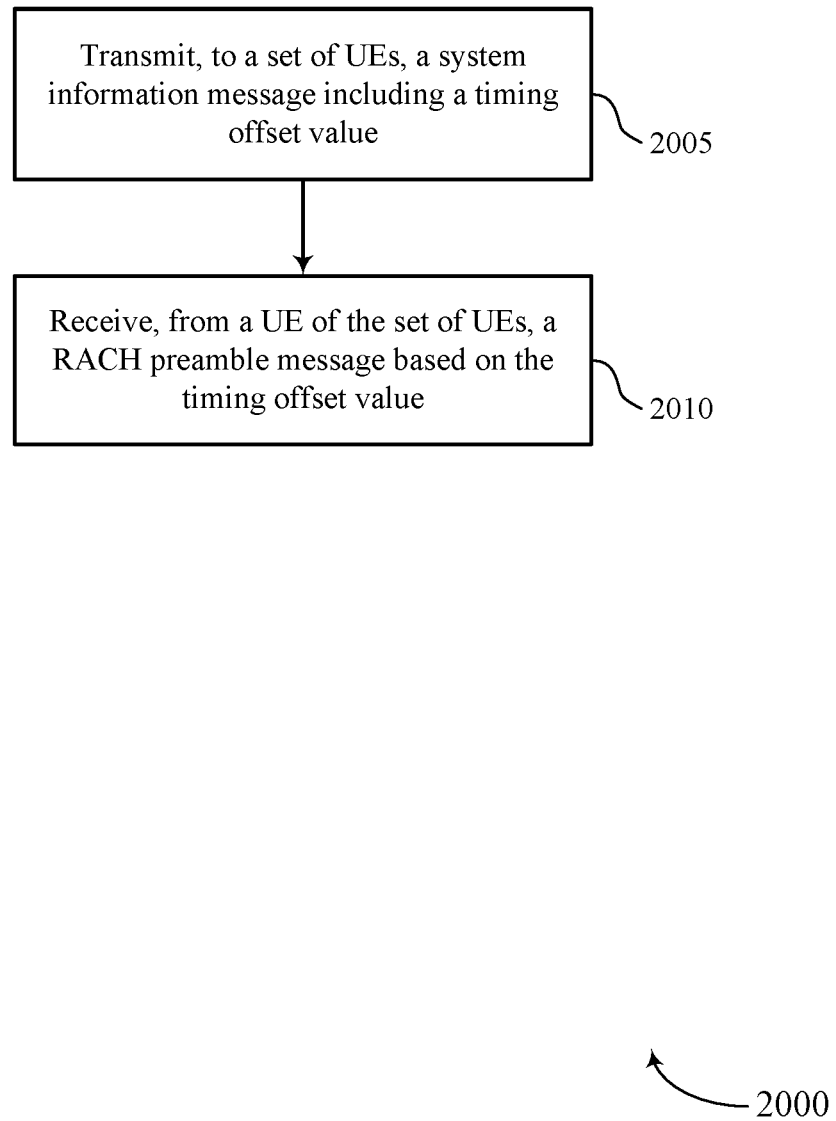

FIG. 20 shows a flowchart illustrating a method 2000 that supports a RACH preamble transmission timing offset, in accordance with one or more aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may transmit, to a set of UEs, a system information message including a timing offset value. The operations of 2005 may be performed according to the methods described herein. In some examples, aspects of the operations of 2005 may be performed by a system information component as described with reference to FIGS. 9 through 12.

At 2010, the base station may receive, from a UE of the set of UEs, a RACH preamble message based on the timing offset value. The operations of 2010 may be performed according to the methods described herein. In some examples, aspects of the operations of 2010 may be performed by a RACH preamble component as described with reference to FIGS. 9 through 12.

Figure 21:
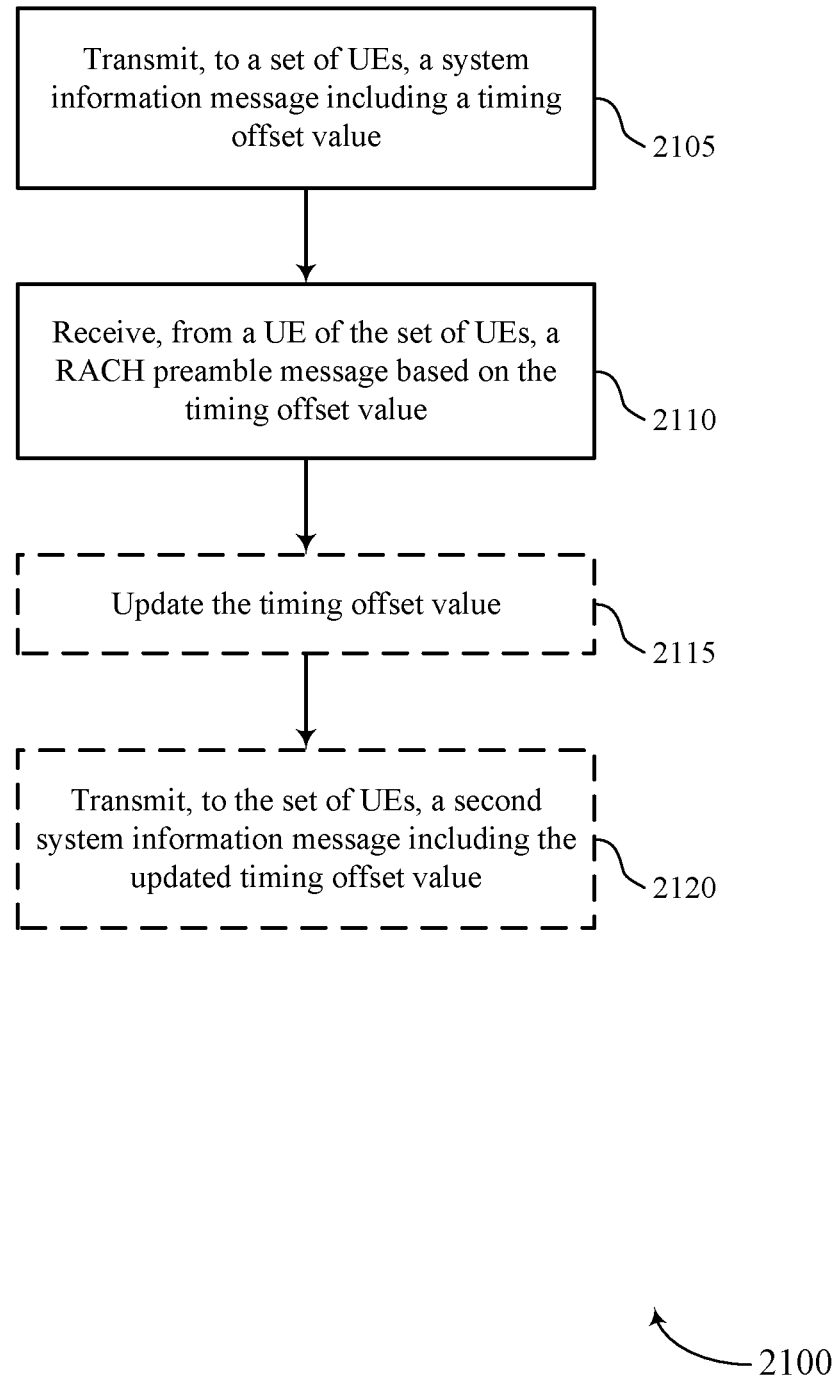

FIG. 21 shows a flowchart illustrating a method 2100 that supports a RACH preamble transmission timing offset, in accordance with one or more aspects of the present disclosure. The operations of method 2100 may be implemented by a base station 105 or its components as described herein. For example, the operations of method 2100 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2105, the base station may transmit, to a set of UEs, a system information message including a timing offset value. The operations of 2105 may be performed according to the methods described herein. In some examples, aspects of the operations of 2105 may be performed by a system information component as described with reference to FIGS. 9 through 12.

At 2110, the base station may receive, from a UE of the set of UEs, a RACH preamble message based on the timing offset value. The operations of 2110 may be performed according to the methods described herein. In some examples, aspects of the operations of 2110 may be performed by a RACH preamble component as described with reference to FIGS. 9 through 12.

At 2115, the base station may update the timing offset value. The operations of 2115 may be performed according to the methods described herein. In some examples, aspects of the operations of 2115 may be performed by an update component as described with reference to FIGS. 9 through 12.

At 2120, the base station may transmit, to the set of UEs, a second system information message including the updated timing offset value. The operations of 2120 may be performed according to the methods described herein. In some examples, aspects of the operations of 2120 may be performed by a system information component as described with reference to FIGS. 9 through 12.

Figure 22:
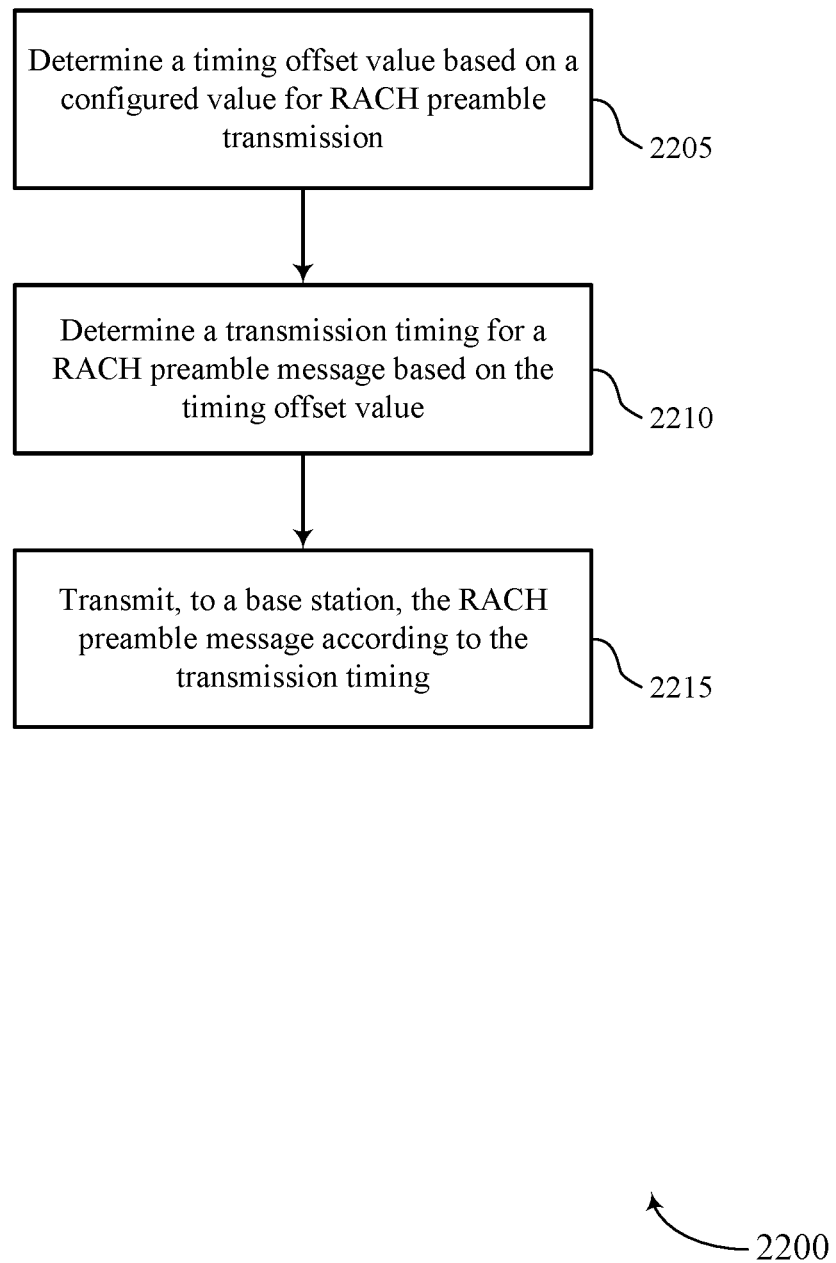

FIG. 22 shows a flowchart illustrating a method 2200 that supports a RACH preamble transmission timing offset, in accordance with one or more aspects of the present disclosure. The operations of method 2200 may be implemented by a UE 115 or its components as described herein. For example, the operations of method 2200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2205, the UE may determine a timing offset value based on a configured value for RACH preamble transmission. The operations of 2205 may be performed according to the methods described herein. In some examples, aspects of the operations of 2205 may be performed by a timing offset component as described with reference to FIGS. 5 through 8.

At 2210, the UE may determine a transmission timing for a RACH preamble message based on the timing offset value. The operations of 2210 may be performed according to the methods described herein. In some examples, aspects of the operations of 2210 may be performed by a transmission timing component as described with reference to FIGS. 5 through 8.

At 2215, the UE may transmit, to a base station, the RACH preamble message according to the transmission timing. The operations of 2215 may be performed according to the methods described herein. In some examples, aspects of the operations of 2215 may be performed by a RACH preamble component as described with reference to FIGS. 5 through 8.

The following provides an overview of aspects of the present disclosure:

Aspect 1: A method for wireless communications at a UE, comprising: receiving, from a base station, a system information message comprising a timing offset value; and transmitting, to the base station, a random access preamble message according to a transmission timing for the random access preamble message, the transmission timing for the random access preamble message based at least in part on the timing offset value.

Aspect 2: The method of aspect 1, further comprising: estimating a propagation delay between the UE and the base station, the transmission timing for the random access preamble message being further based at least in part on the estimated propagation delay.

Aspect 3: The method of aspect 2, further comprising: determining a first timing value corresponding to a slot boundary of a slot for transmitting the random access preamble message; subtracting, from the first timing value, the estimated propagation delay to obtain a second timing value; and adding, to the second timing value, the timing offset value to obtain the transmission timing for the random access preamble message.

Aspect 4: The method of aspect 3, wherein the transmission timing for the random access preamble message precedes the first timing value corresponding to the slot boundary of the slot for transmitting the random access preamble message.

Aspect 5: The method of any of aspects 1 through 4, further comprising: receiving, from the base station and in response to the random access preamble message, a random access response message comprising a timing advance value, the timing advance value based at least in part on the transmission timing for the random access preamble message; modifying the timing advance value based at least in part on the timing offset value; and transmitting, to the base station, a subsequent message according to the modified timing advance value.

Aspect 6: The method of aspect 5, further comprising: setting the timing offset value to zero based at least in part on receiving the random access response message comprising the timing advance value, the subsequent message being transmitted based at least in part on the timing offset value being set to zero.

Aspect 7: The method of aspect 5, the modifying the timing advance value comprising: subtracting the timing offset value from the timing advance value to obtain the modified timing advance value.

Aspect 8: The method of any of aspects 5 through 7, wherein the random access response message comprises a random access Msg2 for a four-step random access procedure or a random access MsgB for a two-step random access procedure.

Aspect 9: The method of any of aspects 1 through 8, further comprising: determining a system timing for the base station, the transmission timing for the random access preamble message being further based at least in part on the system timing.

Aspect 10: The method of any of aspects 1 through 9, the system information message comprising a first system information message, the timing offset value comprising a first timing offset value, the random access preamble message comprising a first random access preamble message, and the method further comprising: receiving, from the base station, a second system information message comprising a second timing offset value different from the first timing offset value; triggering a random access procedure with the base station; and transmitting, to the base station, a second random access preamble message for the triggered random access procedure based at least in part on the second timing offset value.

Aspect 11: The method of any of aspects 1 through 10, wherein the system information message comprises a system information block type one comprising a field indicating the timing offset value.

Aspect 12: The method of any of aspects 1 through 11, wherein the random access preamble message comprises a random access Msg1 for a four-step random access procedure or a random access MsgA for a two-step random access procedure.

Aspect 13: A method for wireless communications at a base station, comprising: transmitting, to a UE, a system information message comprising a timing offset value; and receiving, from the UE, a random access preamble message based at least in part on the timing offset value.

Aspect 14: The method of aspect 13, further comprising: determining a timing advance value based at least in part on a reception time for receiving the random access preamble message.

Aspect 15: The method of aspect 14, further comprising: transmitting, to the UE and in response to the random access preamble message, a random access response message comprising the timing advance value, the random access response message comprising a random access Msg2 for a four-step random access procedure or a random access MsgB for a two-step random access procedure.

Aspect 16: The method of aspect 15, further comprising: receiving, from the UE, a subsequent message based at least in part on the timing advance value and the timing offset value; determining an updated timing advance value based at least in part on a reception time for receiving the subsequent message; and transmitting, to the UE, an indication of the updated timing advance value.

Aspect 17: The method of any of aspects 14 through 16, wherein the reception time for receiving the random access preamble message is based at least in part on the timing offset value, an estimated propagation delay between the UE and the base station, an estimated system timing, or a combination thereof.

Aspect 18: The method of any of aspects 14 through 17, wherein the reception time for receiving the random access preamble message is subsequent to a slot boundary of a slot for receiving the random access preamble message.

Aspect 19: The method of any of aspects 13 through 18, the system information message comprising a first system information message, and the method further comprising: updating the timing offset value; and transmitting, to the UE, a second system information message comprising the updated timing offset value.

Aspect 20: The method of any of aspects 13 through 19, wherein the system information message is transmitted to a plurality of UEs comprising the UE and the system information message comprises a system information block type one comprising a field indicating the timing offset value.

Aspect 21: A method for wireless communications at a UE, comprising: determining a timing offset value based at least in part on a configured value for random access preamble transmission; and transmitting, to a base station, a random access preamble message according to a transmission timing for the random access preamble message, the transmission timing for the random access preamble message based at least in part on the timing offset value.

Aspect 22: The method of aspect 21, further comprising: receiving, from the base station and in response to the random access preamble message, a random access response message comprising a timing advance value, the timing advance value based at least in part on the transmission timing for the random access preamble message; modifying the timing advance value based at least in part on the timing offset value; and transmitting, to the base station, a subsequent message according to the modified timing advance value.

Aspect 23: The method of aspect 22, further comprising: setting the timing offset value to zero based at least in part on receiving the random access response message comprising the timing advance value, the subsequent message being transmitted based at least in part on the timing offset value being set to zero.

Aspect 24: The method of aspect 23, further comprising: triggering a random access procedure; and resetting the timing offset value to the configured value for random access preamble transmission based at least in part on the triggered random access procedure.

Aspect 25: The method of any of aspects 21 through 24, wherein the configured value for random access preamble transmission is pre-configured at the UE.

Aspect 26: The method of any of aspects 21 through 24, further comprising: receiving a configuration message indicating the configured value for random access preamble transmission.

Aspect 27: The method of any of aspects 21 through 26, further comprising: estimating a propagation delay between the UE and the base station; and determining a system timing for the base station, the transmission timing for the random access preamble message being further based at least in part on the estimated propagation delay or the system timing or both.

Aspect 28: A method for wireless communications at a UE, comprising: receiving, from a base station, a message comprising a timing advance value for random access preamble transmission; subtracting a timing offset value from the timing advance value to obtain a modified timing advance value; and transmitting, to the base station, a random access preamble message according to a transmission timing for the random access preamble message, the transmission timing for the random access preamble message based at least in part on the modified timing advance value.

Aspect 29: The method of aspect 28, wherein the modified timing advance value is less than zero based at least in part on the subtracting.

Aspect 30: The method of aspect 28, wherein the modified timing advance value is greater than or equal to zero.

Aspect 31: An apparatus for wireless communications at a UE, comprising a processor; and memory coupled to the processor, the processor and memory configured to perform a method of any of aspects 1 through 12.

Aspect 32: An apparatus for wireless communications at a UE, comprising at least one means for performing a method of any of aspects 1 through 12.

Aspect 33: A non-transitory computer-readable medium storing code for wireless communications at a UE, the code comprising instructions executable by a processor to perform a method of any of aspects 1 through 12.

Aspect 34: An apparatus for wireless communications at a base station, comprising a processor; and memory coupled to the processor, the processor and memory configured to perform a method of any of aspects 13 through 20.

Aspect 35: An apparatus for wireless communications at a base station, comprising at least one means for performing a method of any of aspects 13 through 20.

Aspect 36: A non-transitory computer-readable medium storing code for wireless communications at a base station, the code comprising instructions executable by a processor to perform a method of any of aspects 13 through 20.

Aspect 37: An apparatus for wireless communications at a UE, comprising a processor; and memory coupled to the processor, the processor and memory configured to perform a method of any of aspects 21 through 27.

Aspect 38: An apparatus for wireless communications at a UE, comprising at least one means for performing a method of any of aspects 21 through 27.

Aspect 39: A non-transitory computer-readable medium storing code for wireless communications at a UE, the code comprising instructions executable by a processor to perform a method of any of aspects 21 through 27.

Aspect 40: An apparatus for wireless communications at a UE, comprising a processor; and memory coupled to the processor, the processor and memory configured to perform a method of any of aspects 28 through 30.

Aspect 41: An apparatus for wireless communications at a UE, comprising at least one means for performing a method of any of aspects 28 through 30.

Aspect 42: A non-transitory computer-readable medium storing code for wireless communications at a UE, the code comprising instructions executable by a processor to perform a method of any of aspects 28 through 30.

Aspect 43: A method for wireless communications at a UE, comprising: receiving, from a base station, a system information message comprising a timing offset value; determining a transmission timing for a random access preamble message based at least in part on the timing offset value; and transmitting, to the base station, the random access preamble message according to the transmission timing.

Aspect 44: The method of aspect 43, further comprising: estimating a propagation delay between the UE and the base station, wherein the transmission timing for the random access preamble message is further based at least in part on the estimated propagation delay.

Aspect 45: The method of aspect 44, wherein determining the transmission timing for the random access preamble message comprises: determining a first timing value corresponding to a slot boundary of a slot for transmitting the random access preamble message; subtracting, from the first timing value, the estimated propagation delay to obtain a second timing value; and adding, to the second timing value, the timing offset value to obtain the transmission timing for the random access preamble message.

Aspect 46: The method of aspect 45, wherein the transmission timing for the random access preamble message precedes the first timing value corresponding to the slot boundary of the slot for transmitting the random access preamble message.

Aspect 47: The method of any of aspects 43 through 46, further comprising: receiving, from the base station and in response to the random access preamble message, a random access response message comprising a timing advance value, the timing advance value based at least in part on the transmission timing; modifying the timing advance value based at least in part on the timing offset value; and transmitting, to the base station, a subsequent message according to the modified timing advance value.

Aspect 48: The method of aspect 47, further comprising: setting the timing offset value to zero based at least in part on receiving the random access response message comprising the timing advance value, wherein the subsequent message is transmitted based at least in part on the timing offset value being set to zero.

Aspect 49: The method of either of aspects 47 or 48, wherein modifying the timing advance value comprises:

subtracting the timing offset value from the timing advance value to obtain the modified timing advance value.

Aspect 50: The method of any of aspects 47 through 49, wherein the random access response message comprises a random access message two (Msg2) for a four-step random access procedure or a random access message B (MsgB) for a two-step random access procedure.

Aspect 51: The method of any of aspects 47 through 50, wherein the timing advance value is greater than zero.

Aspect 52: The method of any of aspects 43 through 51, further comprising: determining a system timing for the base station, wherein the transmission timing for the random access preamble message is further based at least in part on the system timing.

Aspect 53: The method of aspect 52, wherein the system timing is determined based at least in part on a global navigation satellite system.

Aspect 54: The method of any of aspects 43 through 53, wherein the system information message comprises a first system information message, the timing offset value comprises a first timing offset value, and the random access preamble message comprises a first random access preamble message, the method further comprising: receiving, from the base station, a second system information message comprising a second timing offset value different from the first timing offset value; triggering a random access procedure with the base station; and transmitting, to the base station, a second random access preamble message for the triggered random access procedure based at least in part on the second timing offset value.

Aspect 55: The method of any of aspects 43 through 54, further comprising: operating in a non-terrestrial network, wherein determining the transmission timing for the random access preamble message based at least in part on the timing offset value is further based at least in part on operating in the non-terrestrial network.

Aspect 56: The method of any of aspects 43 through 55, wherein the system information message comprises a system information block type one comprising a field indicating the timing offset value.

Aspect 57: The method of any of aspects 43 through 56, wherein the random access preamble message comprises a random access message one (Msg1) for a four-step random access procedure or a random access message A (MsgA) for a two-step random access procedure.

Aspect 58: The method of any of aspects 43 through 57, wherein the timing offset value is greater than zero.

Aspect 59: A method for wireless communications at a base station, comprising: transmitting, to a plurality of UEs, a system information message comprising a timing offset value; and receiving, from a UE of the plurality of UEs, a random access preamble message based at least in part on the timing offset value.

Aspect 60: The method of aspect 59, further comprising: determining a timing advance value based at least in part on a reception time for receiving the random access preamble message.

Aspect 61: The method of aspect 60, further comprising: transmitting, to the UE and in response to the random access preamble message, a random access response message comprising the timing advance value.

Aspect 62: The method of aspect 61, further comprising: receiving, from the UE, a subsequent message based at least in part on the timing advance value and the timing offset value; determining an updated timing advance value based at least in part on a reception timing for receiving the subsequent message; and transmitting, to the UE, an indication of the updated timing advance value.

Aspect 63: The method of either of aspects 61 or 62, wherein the random access response message comprises a random access message two (Msg2) for a four-step random access procedure or a random access message B (MsgB) for a two-step random access procedure.

Aspect 64: The method of any of aspects 60 through 63, wherein the reception time for receiving the random access preamble message is based at least in part on the timing offset value.

Aspect 65: The method of any of aspects 60 through 64, wherein the reception time for receiving the random access preamble message is further based at least in part on an estimated propagation delay between the UE and the base station or an estimated system timing or both.

Aspect 66: The method of any of aspects 60 through 65, wherein the reception time for receiving the random access preamble message is subsequent to a slot boundary of a slot for receiving the random access preamble message.

Aspect 67: The method of any of aspects 60 through 66, wherein the timing advance value is greater than zero.

Aspect 68: The method of any of aspects 59 through 67, wherein the system information message comprises a first system information message, the method further comprising: updating the timing offset value; and transmitting, to the plurality of UEs, a second system information message comprising the updated timing offset value.

Aspect 69: The method of any of aspects 59 through 68, further comprising: operating in a non-terrestrial network, wherein transmitting the system information message comprising the timing offset value is based at least in part on operating in the non-terrestrial network.

Aspect 70: The method of any of aspects 59 through 69, wherein the system information message comprises a system information block type one comprising a field indicating the timing offset value.

Aspect 71: The method of any of aspects 59 through 70, wherein the random access preamble message comprises a random access message one (Msg1) for a four-step random access procedure or a random access message A (MsgA) for a two-step random access procedure.

Aspect 72: The method of any of aspects 59 through 71, wherein the timing offset value is greater than zero.

Aspect 73: A method for wireless communications at a UE, comprising: determining a timing offset value based at least in part on a configured value for random access preamble transmission; determining a transmission timing for a random access preamble message based at least in part on the timing offset value; and transmitting, to a base station, the random access preamble message according to the transmission timing.

Aspect 74: The method of aspect 73, further comprising: receiving, from the base station and in response to the random access preamble message, a random access response message comprising a timing advance value, the timing advance value based at least in part on the transmission timing; modifying the timing advance value based at least in part on the timing offset value; and transmitting, to the base station, a subsequent message according to the modified timing advance value.

Aspect 75: The method of aspect 74, further comprising: setting the timing offset value to zero based at least in part on receiving the random access response message comprising the timing advance value, wherein the subsequent message is transmitted based at least in part on the timing offset value being set to zero.

Aspect 76: The method of aspect 75, further comprising: triggering a random access procedure; and resetting the timing offset value to the configured value for random access preamble transmission based at least in part on the triggered random access procedure.

Aspect 77: The method of any of aspects 73 through 76, wherein the configured value for random access preamble transmission is pre-configured at the UE.

Aspect 78: The method of any of aspects 73 through 76, further comprising: receiving a configuration message indicating the configured value for random access preamble transmission.

Aspect 79: The method of any of aspects 73 through 78, further comprising: estimating a propagation delay between the UE and the base station; and determining a system timing for the base, wherein the transmission timing for the random access preamble message is further based at least in part on the estimated propagation delay or the system timing or both.

Aspect 80: The method of any of aspects 73 through 79, further comprising: operating in a non-terrestrial network, wherein determining the transmission timing for the random access preamble message based at least in part on the timing offset value is further based at least in part on operating in the non-terrestrial network.

Aspect 81: The method of any of aspects 73 through 80, wherein the configured value for random access preamble transmission is greater than zero.

Aspect 82: An apparatus for wireless communication comprising at least one means for performing a method of any one of aspects 43 through 58.

Aspect 83: An apparatus for wireless communication comprising at least one means for performing a method of any one of aspects 59 through 72.

Aspect 84: An apparatus for wireless communication comprising at least one means for performing a method of any one of aspects 73 through 81.

Aspect 85: An apparatus for wireless communication comprising a processor; and memory coupled to the processor, the memory and processor configured to perform a method of any one of aspects 43 through 58.

Aspect 86: An apparatus for wireless communication comprising a processor; and memory coupled to the processor, the memory and processor configured to perform a method of any one of aspects 59 through 72.

Aspect 87: An apparatus for wireless communication comprising a processor; and memory coupled to the processor, the memory and processor configured to perform a method of any one of aspects 73 through 81.

Aspect 88: A non-transitory computer-readable medium storing code for wireless communication comprising a processor, memory in electronic communication with the processor, and instructions stored in the memory and executable by the processor to cause the apparatus to perform a method of any one of aspects 43 through 58.

Aspect 89: A non-transitory computer-readable medium storing code for wireless communication comprising a processor, memory in electronic communication with the processor, and instructions stored in the memory and executable by the processor to cause the apparatus to perform a method of any one of aspects 59 through 72.

Aspect 90: A non-transitory computer-readable medium storing code for wireless communication comprising a processor, memory in electronic communication with the processor, and instructions stored in the memory and executable by the processor to cause the apparatus to perform a method of any one of aspects 73 through 81.

It should be noted that the methods described herein describe possible implementations, and that the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example process that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor; and
   memory coupled to the processor, the processor configured to:
   receive, from a network device, a system information message that comprises a timing offset value;
   transmit, to the network device via a physical random access channel, a random access preamble message in accordance with a transmission timing for the random access preamble message, the transmission timing for the random access preamble message based at least in part on the timing offset value;
   receive, from the network device and in response to the random access preamble message, a random access response message that comprises a timing advance value, the timing advance value based at least in part on the transmission timing for the random access preamble message; and
   transmit, to the network device via a second channel different from the physical random access channel, a subsequent message based at least in part on the timing advance value and the timing offset value set to zero.

2. The apparatus of claim 1, wherein the processor is further configured to:
   estimate a propagation delay between the UE and the network device, the transmission timing for the random access preamble message further based at least in part on the estimated propagation delay.

3. The apparatus of claim 2, wherein the processor is further configured to:
   determine a first timing value that corresponds to a slot boundary of a slot for transmission of the random access preamble message;
   subtract, from the first timing value, the estimated propagation delay to obtain a second timing value; and
   add, to the second timing value, the timing offset value to obtain the transmission timing for the random access preamble message.

4. The apparatus of claim 3, wherein the transmission timing for the random access preamble message precedes the first timing value corresponding to the slot boundary of the slot for transmission of the random access preamble message.

5. The apparatus of claim 1, wherein the processor is further configured to:
   modify the timing advance value based at least in part on the timing offset value; and
   transmit, to the network device via the physical random access channel, a third random access message in accordance with the modified timing advance value.

6. The apparatus of claim 1, wherein the processor is configured to:
   set the timing offset value to zero for the second channel based at least in part on the reception of the random access response message that comprises the timing advance value.

7. The apparatus of claim 5, wherein, to modify the timing advance value, the processor is configured to:
   subtract the timing offset value from the timing advance value to obtain the modified timing advance value for transmission of the third random access message.

8. The apparatus of claim 1, wherein the random access response message comprises a random access message two (Msg2) for a four-step random access procedure or a random access message B (MsgB) for a two-step random access procedure.

9. The apparatus of claim 1, wherein the processor is further configured to:
   determine a system timing for the network device, the transmission timing for the random access preamble message being further based at least in part on the system timing.

10. The apparatus of claim 1, wherein the system information message comprises a first system information message, the timing offset value comprises a first timing offset value, the random access preamble message comprises a first random access preamble message, and the processor is further configured to:
   receive, from the network device, a second system information message comprising a second timing offset value different from the first timing offset value;
   trigger a random access procedure with the network device; and
   transmit, to the network device, a second random access preamble message for the triggered random access procedure based at least in part on the second timing offset value.

11. The apparatus of claim 1, wherein the system information message comprises a system information block type one that comprises a field indicating the timing offset value.

12. The apparatus of claim 1, wherein the random access preamble message comprises a random access message one (Msg1) for a four-step random access procedure or a random access message A (MsgA) for a two-step random access procedure.

13. An apparatus for wireless communications at station network device, comprising:
   a processor; and
   memory coupled to the processor, the processor configured to:
      output a system information message that comprises a timing offset value;
      obtain, for a user equipment (UE) via a physical random access channel, a random access preamble message in accordance with a transmission timing for the random access preamble message, the transmission timing for the random access preamble message based at least in part on the timing offset value;
      output, for the UE and in response to the random access preamble message, a random access response message that comprises a timing advance value, the timing advance value based at least in part on a reception time for the random access preamble message; and
      obtain, for the UE via a second channel different from the physical random access channel, a subsequent message based at least in part on the timing advance value and the timing offset value set to zero.

14. The apparatus of claim 13, wherein the random access response message comprises a random access message two (Msg2) for a four-step random access procedure or a random access message B (MsgB) for a two-step random access procedure.

15. The apparatus of claim 13, wherein the processor is further configured to:
   obtain, for the UE, a second subsequent message based at least in part on the timing advance value and the timing offset value;
   determine an updated timing advance value based at least in part on a second reception time for the second subsequent message; and
   output, for the UE, an indication of the updated timing advance value.

16. The apparatus of claim 13, wherein the reception time for the random access preamble message is based at least in part on the timing offset value, an estimated propagation delay between the UE and the network device, an estimated system timing, or a combination thereof.

17. The apparatus of claim 13, wherein the reception time for the random access preamble message is subsequent to a slot boundary of a slot for reception of the random access preamble message.

18. The apparatus of claim 13, wherein the system information message comprises a first system information message and the processor is further configured to:
   update the timing offset value; and
   output a second system information message that comprises the updated timing offset value.

19. The apparatus of claim 13, wherein the system information message is output to a plurality of UEs comprising the UE and the system information message comprises a system information block type one that comprises a field indicating the timing offset value.

20. An apparatus for wireless communications at a user equipment (UE), comprising:
   a processor; and
   memory coupled to the processor, the processor configured to:
      determine a timing offset value based at least in part on a configured value for random access preamble transmission; and
      transmit, to a network device via a physical random access channel, a random access preamble message in accordance with a transmission timing for the random access preamble message, the transmission timing for the random access preamble message based at least in part on the timing offset value;
      receive, from the network device and in response to the random access preamble message, a random access response message that comprises a timing advance value, the timing advance value based at least in part on the transmission timing for the random access preamble message; and
      transmit, to the network device via a second channel different from the physical random access channel, a subsequent message based at least in part on the timing advance value and the timing offset value set to zero.

21. The apparatus of claim 20, wherein the processor is further configured to:
   modify the timing advance value based at least in part on the timing offset value; and
   transmit, to the network device via the physical random access channel, a third random access message in accordance with the modified timing advance value.

22. The apparatus of claim 21, wherein the processor is configured to:
   set the timing offset value to zero for the second channel based at least in part on the reception of the random access response message that comprises the timing advance value.

23. The apparatus of claim 22, wherein the processor is further configured to:
   trigger a random access procedure; and
   reset the timing offset value to the configured value for random access preamble transmission based at least in part on the triggered random access procedure.

24. The apparatus of claim 20, wherein the configured value for random access preamble transmission is preconfigured at the UE.

25. The apparatus of claim 20, wherein the processor is further configured to:
receive a configuration message that indicates the configured value for random access preamble transmission.

26. The apparatus of claim 20, wherein the processor is further configured to:
estimate a propagation delay between the UE and the network device; and
determine a system timing for the network device, the transmission timing for the random access preamble message further based at least in part on the estimated propagation delay or the system timing or both.

27. An apparatus for wireless communications at a user equipment (UE), comprising:
a processor; and
memory coupled to the processor, the processor configured to:
receive, from a network device, a message that comprises a timing advance value for random access preamble transmission;
subtract a timing offset value from the timing advance value to obtain a modified timing advance value;
transmit, to the network device via a physical random access channel, a random access preamble message in accordance with a transmission timing for the random access preamble message, the transmission timing for the random access preamble message based at least in part on the modified timing advance value;
receive, from the network device and in response to the random access preamble message, a random access response message that comprises a second timing advance value, the second timing advance value based at least in part on the transmission timing for the random access preamble message; and
transmit, to the network device via a second channel different from the physical random access channel, a subsequent message based at least in part on the second timing advance value and the timing offset value set to zero.

28. The apparatus of claim 27, wherein the modified timing advance value is less than zero based at least in part on the subtraction.

29. The apparatus of claim 27, wherein the modified timing advance value is greater than or equal to zero.

30. A method for wireless communications at a user equipment (UE), comprising:
receiving, from a network device, a system information message that comprises a timing offset value;
transmitting, to the network device via a physical random access channel, a random access preamble message in accordance with a transmission timing for the random access preamble message, the transmission timing for the random access preamble message based at least in part on the timing offset value;
receiving, from the network device and in response to the random access preamble message, a random access response message that comprises a timing advance value, the timing advance value based at least in part on the transmission timing for the random access preamble message; and
transmitting, to the network device via a second channel different from the physical random access channel, a subsequent message based at least in part on the timing advance value and the timing offset value set to zero.

31. The method of claim 30, further comprising:
estimating a propagation delay between the UE and the network device, the transmission timing for the random access preamble message being further based at least in part on the estimated propagation delay.

32. The method of claim 30, further comprising:
modifying the timing advance value based at least in part on the timing offset value; and
transmitting, to the network device via the physical random access channel, a third random access message in accordance with the modified timing advance value.

33. A method for wireless communications at a network device, comprising:
outputting a system information message that comprises a timing offset value;
obtaining, for a user equipment (UE) via a physical random access channel, a random access preamble message in accordance with a transmission timing for the random access preamble message, the transmission timing for the random access preamble message based at least in part on the timing offset value;
outputting, for the UE and in response to the random access preamble message, a random access response message that comprises a timing advance value, the timing advance value based at least in part on a reception time for the random access preamble message; and
obtaining, for the UE via a second channel different from the physical random access channel, a subsequent message based at least in part on the timing advance value and the timing offset value set to zero.

34. The method of claim 33, further comprising:
obtaining, for the UE, a second subsequent message based at least in part on the timing advance value and the timing offset value;
determining an updated timing advance value based at least in part on a second reception time for the second subsequent message; and
outputting, for the UE, an indication of the updated timing advance value.

35. A method for wireless communications at a user equipment (UE), comprising:
determining a timing offset value based at least in part on a configured value for random access preamble transmission;
transmitting, to a network device via a physical random access channel, a random access preamble message in accordance with a transmission timing for the random access preamble message, the transmission timing for the random access preamble message based at least in part on the timing offset value;
receiving, from the network device and in response to the random access preamble message, a random access response message that comprises a timing advance value, the timing advance value based at least in part on the transmission timing for the random access preamble message; and
transmitting, to the network device via a second channel different from the physical random access channel, a subsequent message based at least in part on the timing advance value and the timing offset value set to zero.

36. The method of claim 35, further comprising:
modifying the timing advance value based at least in part on the timing offset value; and transmitting, to the network device via the physical random access channel, a third random access message in accordance with the modified timing advance value.

37. A method for wireless communications at a user equipment (UE), comprising:
receiving, from a network device, a message that comprises a timing advance value for random access preamble transmission;
subtracting a timing offset value from the timing advance value to obtain a modified timing advance value;
transmitting, to the network device via a physical random access channel, a random access preamble message in accordance with a transmission timing for the random access preamble message, the transmission timing for the random access preamble message based at least in part on the modified timing advance value;
receiving, from the network device and in response to the random access preamble message, a random access response message that comprises a second timing advance value, the second timing advance value based at least in part on the transmission timing for the random access preamble message; and
transmitting, to the network device via a second channel different from the physical random access channel, a subsequent message based at least in part on the second timing advance value and the timing offset value set to zero.

38. A non-transitory computer-readable medium storing code for wireless communications at a user equipment (UE), the code comprising instructions executable by a processor to:
receive, from a network device, a system information message that comprises a timing offset value;
transmit, to the network device via a physical random access channel, a random access preamble message in accordance with a transmission timing for the random access preamble message, the transmission timing for the random access preamble message based at least in part on the timing offset value;
receive, from the network device and in response to the random access preamble message, a random access response message that comprises a timing advance value, the timing advance value based at least in part on the transmission timing for the random access preamble message; and
transmit, to the network device via a second channel different from the physical random access channel, a subsequent message based at least in part on the timing advance value and the timing offset value set to zero.

39. The non-transitory computer-readable medium of claim 38, wherein the instructions are further executable by the processor to:
estimate a propagation delay between the UE and the network device, the transmission timing for the random access preamble message being further based at least in part on the estimated propagation delay.

40. The non-transitory computer-readable medium of claim 38, wherein the instructions are further executable by the processor to:
modify the timing advance value based at least in part on the timing offset value; and
transmit, to the network device via the physical random access channel, a third random access message in accordance with the modified timing advance value.

41. A non-transitory computer-readable medium storing code for wireless communications at a network device, the code comprising instructions executable by a processor to:
output a system information message that comprises a timing offset value;
obtain, for a user equipment (UE) via a physical random access channel, a random access preamble message in accordance with a transmission timing for the random access preamble message, the transmission timing for the random access preamble message based at least in part on the timing offset value;
output, for the UE and in response to the random access preamble message, a random access response message that comprises a timing advance value, the timing advance value based at least in part on a reception time for the random access preamble message; and
obtain, for the UE via a second channel different from the physical random access channel, a subsequent message based at least in part on the timing advance value and the timing offset value set to zero.

42. The non-transitory computer-readable medium of claim 41, wherein the instructions are further executable by the processor to:
obtain, for the UE, a second subsequent message based at least in part on the timing advance value and the timing offset value;
determine an updated timing advance value based at least in part on a second reception time for the second subsequent message; and
output, for the UE, an indication of the updated timing advance value.

43. A non-transitory computer-readable medium storing code for wireless communications at a user equipment (UE), the code comprising instructions executable by a processor to:
determine a timing offset value based at least in part on a configured value for random access preamble transmission;
transmit, to a network device via a physical random access channel, a random access preamble message in accordance with a transmission timing for the random access preamble message, the transmission timing for the random access preamble message based at least in part on the timing offset value;
receive, from the network device and in response to the random access preamble message, a random access response message that comprises a timing advance value, the timing advance value based at least in part on the transmission timing for the random access preamble message; and
transmit, to the network device via a second channel different from the physical random access channel, a subsequent message based at least in part on the timing advance value and the timing offset value set to zero.

44. The non-transitory computer-readable medium of claim 43, wherein the instructions are further executable by the processor to:
modify the timing advance value based at least in part on the timing offset value; and
transmit, to the network device via the physical random access channel, a third random access message in accordance with the modified timing advance value.

45. A non-transitory computer-readable medium storing code for wireless communications at a user equipment (UE), the code comprising instructions executable by a processor to:
receive, from a network device, a message that comprises a timing advance value for random access preamble transmission;

subtract a timing offset value from the timing advance value to obtain a modified timing advance value;

transmit, to the network device via a physical random access channel, a random access preamble message in accordance with a transmission timing for the random access preamble message, the transmission timing for the random access preamble message based at least in part on the modified timing advance value;

receive, from the network device and in response to the random access preamble message, a random access response message that comprises a second timing advance value, the second timing advance value based at least in part on the transmission timing for the random access preamble message; and transmit, to the network device via a second channel different from the physical random access channel, a subsequent message based at least in part on the second timing advance value and the timing offset value set to zero.

\* \* \* \* \*